(12) United States Patent
Frank et al.

(10) Patent No.: US 9,926,994 B2
(45) Date of Patent: Mar. 27, 2018

(54) COMPRESSED AIR SUPPLY INSTALLATION, PNEUMATIC SYSTEM AND METHOD

(75) Inventors: Dieter Frank, Hannover (DE); Frank Meissner, Hannover (DE)

(73) Assignee: WABCO GmbH, Hannover (DE)

(*) Notice: Subject to any disclaimer, the term of this patent is extended or adjusted under 35 U.S.C. 154(b) by 585 days.

(21) Appl. No.: 13/992,322

(22) PCT Filed: Nov. 22, 2011

(86) PCT No.: PCT/EP2011/005862
§ 371 (c)(1),
(2), (4) Date: Jun. 20, 2013

(87) PCT Pub. No.: WO2012/079687
PCT Pub. Date: Jun. 21, 2012

(65) Prior Publication Data
US 2013/0318954 A1    Dec. 5, 2013

(30) Foreign Application Priority Data

Dec. 16, 2010   (DE) .................. 10 2010 054 713

(51) Int. Cl.
*F16F 9/02* (2006.01)
*B60G 17/015* (2006.01)
*B60G 17/052* (2006.01)

(52) U.S. Cl.
CPC .......... *F16F 9/02* (2013.01); *B60G 17/0155* (2013.01); *B60G 17/0523* (2013.01);
(Continued)

(58) Field of Classification Search
CPC ..... F16B 11/028; F16B 11/064; F16B 11/068; F16H 61/4043; F16H 61/4052
See application file for complete search history.

(56) References Cited

U.S. PATENT DOCUMENTS 4,544,385 A * 10/1985 Tanaka ................ B01D 53/261
137/341
4,572,725 A *  2/1986 Kojima ............... B01D 53/261
55/518
(Continued)

FOREIGN PATENT DOCUMENTS

DE      2 016 030       2/1972
DE     35 01 708 A1     7/1986
(Continued)

*Primary Examiner* — Michael Leslie
*Assistant Examiner* — Matthew Wiblin
(74) *Attorney, Agent, or Firm* — Leydig, Voit & Mayer, Ltd.

(57) ABSTRACT

A compressed air supply installation for operating a pneumatic installation, especially an air suspension installation of a vehicle, includes: an air supply unit and an air compression unit for supplying a compressed air supply unit with compressed air, a pneumatic connection, especially a bleeding line, comprising a bleeding valve system in the form of a controllable solenoid valve system and a bleeding port for bleeding air, and a pneumatic connection, especially a compressed air supply line, comprising an air drier and a compressed air port for supplying compressed air. The solenoid valve system comprises a primary valve and a secondary valve, which are actuatable by a controller of the solenoid valve system that is common to both valves and acts upon both valves.

27 Claims, 12 Drawing Sheets

(52) U.S. Cl.
CPC .... *B60G 2202/152* (2013.01); *B60G 2300/07* (2013.01); *B60G 2500/2012* (2013.01); *B60G 2500/2021* (2013.01); *B60G 2500/2044* (2013.01); *B60G 2500/30* (2013.01); *B60G 2600/26* (2013.01)

(56) References Cited

U.S. PATENT DOCUMENTS

| | | | |
|---|---|---|---|
| 4,655,255 A * | 4/1987 | Rode | F16K 31/0606 137/596.17 |
| 4,755,196 A * | 7/1988 | Frania | B60T 17/004 96/116 |
| 4,756,548 A | 7/1988 | Kaltenthaler et al. | |
| 5,069,302 A | 12/1991 | Kageyama | |
| 5,129,927 A * | 7/1992 | Tsubouchi | B01D 53/261 96/113 |
| 5,142,897 A | 9/1992 | Pischke et al. | |
| 5,600,953 A * | 2/1997 | Oshita | B60G 17/0523 60/453 |
| 5,711,150 A * | 1/1998 | Oshita | B60G 17/0523 60/407 |
| 6,074,177 A * | 6/2000 | Kobayashi | F04B 39/16 417/313 |
| 6,726,224 B2 | 4/2004 | Jurr et al. | |
| 6,824,145 B2 * | 11/2004 | Behmenburg | B60C 23/10 152/416 |
| 7,194,345 B2 | 3/2007 | Heer | |
| 7,789,950 B2 * | 9/2010 | Hoffman | B01D 45/16 55/DIG. 17 |
| 7,905,557 B2 | 3/2011 | Frank et al. | |
| 8,899,598 B2 * | 12/2014 | Frank | F16K 31/0651 137/565.18 |
| 9,062,571 B2 * | 6/2015 | Frank | F01L 1/34 |
| 2002/0153688 A1 * | 10/2002 | Jurr | B60G 17/0523 280/124.16 |
| 2007/0236084 A1 * | 10/2007 | Frank | B60T 8/327 303/119.2 |
| 2008/0078456 A1 | 4/2008 | Thorns | |
| 2009/0309413 A1 | 12/2009 | Bensch et al. | |

FOREIGN PATENT DOCUMENTS

| | | | | |
|---|---|---|---|---|
| DE | 35 42 974 A1 | 6/1987 | | |
| DE | 39 17 245 A1 | 11/1989 | | |
| DE | 43 27 764 A1 | 2/1995 | | |
| DE | 199 11 933 B4 | 9/1999 | | |
| DE | 103 14 643 A1 | 10/2004 | | |
| DE | 10 2004 035 763 A1 | 3/2006 | | |
| DE | 10 2006 041 010 A1 | 3/2008 | | |
| DE | 10 2006 046 854 A1 | 4/2008 | | |
| DE | 10 2007 009 767 A1 | 8/2008 | | |
| DE | 10 2007 032 964 A1 | 1/2009 | | |
| DE | 102007032964 A1 * | 1/2009 | | F15B 11/042 |
| DE | 10 2007 058 385 A1 | 4/2009 | | |
| DE | 10 2008 023 147 A1 | 11/2009 | | |
| EP | 1 165 333 B2 | 1/2002 | | |

* cited by examiner

COMPRESSED AIR SUPPLY INSTALLATION, PNEUMATIC SYSTEM AND METHOD

FIELD OF THE INVENTION

The present invention generally relates to a compressed air supply system and method for operating a pneumatic device.

BACKGROUND OF THE INVENTION

Compressed air supply systems are used in vehicles of all types, especially to supply pneumatic spring units with compressed air. Pneumatic spring units can also comprise level control devices, with which the distance between vehicle axle and vehicle body can be adjusted. A pneumatic spring unit of a pneumatic system can comprise a number of air bellows, which are pneumatically connected to a common line (gallery) and can raise the vehicle body as their filling content increases and lower the vehicle body as their compressed air content decreases. With increasing distance between vehicle axle and vehicle body, or ground clearance, the spring deflections become greater and greater, and ground unevenness can also be overcome without contact with the vehicle body occurring. Such systems are used in off-road vehicles and in sport utility vehicles and the like (SUVs). Particularly in the case of SUVs, it is desirable in the case of high performance engines to provide the vehicle, on the one hand, with comparatively small ground clearance for high speeds on the road, and, on the other hand, with a comparatively large ground clearance for off-road duty. It is also desirable to implement a change of the ground clearance as quickly as possible, which increases the requirements with regard to speed, flexibility and reliability of a compressed air supply system.

A compressed air supply system for use in a pneumatic system with a pneumatic device, for example of a pneumatic spring unit, is operated with compressed air from a compressed air feed, for example in the range of a pressure level of between about 5 and 20 bar. The compressed air is made available to the compressed air feed by means of a compressed air generator (compressor). For supplying the pneumatic device, the compressed air feed is pneumatically connected to a compressed air port and, on the other side, is pneumatically connected to a vent port. Via a vent valve arrangement, the compressed air supply system and/or pneumatic device, by releasing air, can be vented towards the vent port.

For ensuring long-term operation of the compressed air supply system, an air drier is provided, with which the compressed air is to be dried. As a result, the accumulation of moisture in the pneumatic system is avoided, which, in the case of comparatively low temperatures, can otherwise lead to valve-damaging crystallization, and to other undesirable effects in the compressed air supply system and in the pneumatic device. An air drier has a desiccant, usually a granular bed, through which the compressed air can flow so that the desiccant—at comparatively high pressure—can absorb moisture contained within the compressed air by means of adsorption. An air drier can be designed as a regenerative air drier, if applicable. To this end, the dried compressed air from the pneumatic spring system can flow through the desiccant during each venting cycle—at comparatively low pressure—in counterflow relative to the filling direction. For this, the vent valve arrangement can be opened. For such a use—also referred to as pressure swing adsorption—it has proved to be desirable to design a compressed air supply system with flexibility and at the same time reliability. In particular, a comparatively rapid venting with a pressure swing, which is nevertheless adequate for a regeneration of the air drier, is desirable.

A solenoid valve for realizing a multiple function can be achieved with at least three connected pneumatic chambers—specifically for the pneumatic connection of functionally different, always separate pneumatic chambers that are provided with different levels of pressurization—with two separate lift armatures in a common excitation coil of the solenoid valve. Each of the lift armatures is associated with a different separate pneumatic chamber in each case. In principle, such a double-armature solenoid valve is known, for example, from DE 201 60 30 or from patent cases of the present applicant, such as DE 35 01 708 A1 or DE 10 2006 041 010 A1. The basic principle of operation of a double-armature solenoid valve can be gleaned from DE 10 2004 035 763 A1, for example, which is also a case of the present applicant.

A level control device for vehicles with air filters, with which a predetermined distance of the vehicle's framework from the vehicle's axle can be maintained by filling or emptying the pneumatic springs as a function of the vehicle's load, is known from the present applicant's DE 35 429 74 A1. The device includes a safety valve that can be controlled by the pressure in the pneumatic springs.

DE 199 11 933 B4 discloses a compressed air generator with an air drier with a first compressed air supply line, wherein the compressed air is directed through a desiccant, and with a second compressed air supply line without the compressed air being directed through the desiccant.

A compressed air supply system of the general type under consideration is disclosed in EP 1 165 333 B2 within the scope of a pneumatic system with a pneumatic spring unit. In addition to a separately blockable main vent line, this has a high-pressure vent line with an additional high-pressure vent valve in addition to the main vent valve—pneumatically operated by a control valve—in the main vent line and which is connected in parallel to the main vent line. The free flow cross section of the separate high-pressure vent valve is smaller than that of the main vent valve. Such a compressed air supply system is still open to improvement. It has been shown that during the venting of such a compressed air supply system via the high-pressure vent line, the venting of dry air, which is not used for the regeneration of the desiccant, is carried out. This amounts to an unnecessary waste of dry air, especially when a flexible, fast and yet reliable operation of the compressed air supply system, which is suitable for the above applications, with a correspondingly high operating rate should be required. Via the control valve, which is provided with a comparatively small nominal diameter, a main vent valve, which can be designed with a comparatively large nominal diameter, can therefore be pneumatically pre-controlled. However, such an arrangement, which is designed for the indirect connecting of a compressed air volume, is comparatively costly.

SUMMARY OF THE INVENTION

It is an object of the present invention to provide an improved, simplified compressed air supply system and method for operating a pneumatic device that has a reliable and yet flexible, possibly fast principle of operation—, that is, a compressed air supply system of comparatively simple construction and capable of comparatively rapid venting. It is also an object of the present invention to, not only improve the venting and/or drying (regeneration) capacity of the compressed air supply system, but to improve the acoustics (reduce noise) of the compressed air supply system during venting. It is a further object of the invention to provide an improved pneumatic system comprising an improved compressed air supply system and a pneumatic device.

To realize a flexible and fast operation of the compressed air supply system, it is advantageous to design, especially to increase, the available pneumatic nominal diameter of the solenoid valve arrangement, especially of the vent solenoid valve, in a flexible manner for a pneumatic section of the solenoid valve arrangement. The nominal diameter is provided as a transition between two pneumatic chambers—associated with the solenoid valve arrangement—of a vent line, specifically of a pneumatic chamber of the vent line located upstream of the solenoid valve arrangement and of a pneumatic chamber of the vent line located downstream of the solenoid valve arrangement. Both the compressed air supply systems, which are known, and the solutions that are provided for the double-armature solenoid valves provide a single limited nominal diameter of a pneumatic section of a solenoid valve arrangement for a pneumatic line. This ultimately leads to a fixed and limited nominal diameter of a solenoid valve arrangement, provided for venting and/or drier regeneration, in the form of the single nominal diameter of the solenoid valve. This, as recognized by the invention, has proved to be possibly inadequate or inflexible. The invention has recognized that a flexible design, especially an increase, of the maximum available nominal diameter in a solenoid valve arrangement in a pneumatic line can be achieved by a pneumatic section of the solenoid valve arrangement having a primary valve and a secondary valve in the pneumatic line. The valves can be connected in parallel or in series, and being normally open or closed—this being in any combination. A series arrangement and parallel arrangement of the primary valve and secondary valve are suitable for a particularly flexibly designable, time-based switching sequence of the primary valve and secondary valve so that different nominal diameters can be provided at different time points for the vent line. As a result, pressure peaks during venting, and therefore the acoustics, can be reduced, especially vent popping noises. A parallel arrangement is advantageous for an incremental increase of the nominal diameters that are provided for the vent line so that particularly fast venting can still be carried out while avoiding the vent popping noise. Generally, excessive acoustics such as the vent popping noise can occur during a venting process when an excessive compressed air volume is vented in an exceedingly short time, i.e., in the case of excessively high pressure amplitude. On the other hand, for a best possible regeneration of the air drier a comparatively high pressure swing amplitude is desired. Increased efficiency with regard to venting and drier regeneration on the one hand and a low-noise operating principle on the other hand can therefore present competing conditions. It will be appreciated that the invention achieves a particularly advantageous compromise between drier regeneration and venting efficiency on the one hand and acoustics on the other hand.

Furthermore, a reliable and structurally simplified solution can be realized according to the invention by the primary valve and the secondary valve being able to be activated by a common controller of the magnetic section of the solenoid valve arrangement, which acts upon the primary valve and secondary valve. In other words, for the primary valve and the secondary valve of the pneumatic section, a common magnetic section of the solenoid valve arrangement can be used. The pneumatically acting parts, such as the valve as such with valve body, valve seat, valve housing or the like, are associated with a pneumatic section of a solenoid valve arrangement. The electrically and/or magnetically acting parts, such as actuators and/or controllers for the valve, such as coil, armature, winding, yoke, magnetic core, control line and also connecting point or interchange point or the like to a control unit or to the coil, are associated with a magnetic section of a solenoid valve arrangement.

In all, the inventive embodiments provide improved functionality of the solenoid valve arrangement inside the compressed air supply system. Therefore, the solenoid valve arrangement can advantageously be realized in a practical manner without functional limitations, even in the case of low pre-control pressures or low bellows pressures, for a pneumatic spring unit. With regard to the functionality, an advantageous extension of the functional range to high pressures is created, especially in the case of yet larger nominal diameters of the solenoid valve arrangement overall, that is, especially in the case of a summing of the nominal diameters of the primary valve and secondary valve in the case of a pneumatic parallel connection of these valves. As an essential advantage, the possibility is created of a more flexibly designable and especially increased nominal diameter range of the solenoid valve arrangement in combination with a comparatively simple realization and the improved utilization of installation space associated therewith in relation to previously known solutions.

According to one embodiment, a pneumatic vent-side port and pneumatic compressed air connection-side port of the solenoid valve arrangement are advantageously connected to a single pneumatic line.

The compressed air feed and the compressed air port are advantageously connected to the compressed air supply line and/or the compressed air feed and the vent port are connected to the vent line. In particular, the compressed air supply line and the vent line form two separate pneumatic connections. In particular, the vent line branches from the compressed air supply line at the compressed air feed.

The compressed air connection-side port is advantageously directly or indirectly connected to the compressed air feed as the nearest connection. The vent-side connection is advantageously directly or indirectly connected to the vent port as the nearest connection. The solenoid valve arrangement is advantageously connected to only two pneumatic chambers of the vent line, which are common to the primary valve and to the secondary valve. In the case of a parallel connection, two alternative pneumatic ducts with the primary valve or the secondary valve are provided in the single line and can be selected alternatively to each other or in combination between the vent-side port and the compressed air connection-side port. The pneumatic ducts can be realized by means of separate branch lines, especially in the case of a parallel connection of the primary valve and secondary valve. In the case of a series connection of the primary valve and secondary valve, the pneumatic lines can also be realized by the single common line for which different nominal diameters can be opened at different time points. The nominal diameters can be realized for example via suitable restrictors in the single common line or in the ducts or by forming openings or valve seats in the primary valve and/or secondary valve.

The single common pneumatic line can advantageously be a vent line. In other words, the compressed air feed and the vent can be connected to a vent line, wherein the solenoid valve arrangement is arranged between two connections in the vent line. Additionally or alternatively, the single common pneumatic line can also be designed as a compressed air supply line. In this case, the compressed air supply line is at least partially also designed as a vent line. This provides that the compressed air feed and the compressed air connection for the pneumatic device are connected to a compressed air supply line, wherein the solenoid valve arrangement is arranged between two connections in the compressed air supply line.

Advantageously, the solenoid valve arrangement can have a single pneumatic vent-side port and/or a single pneumatic compressed air connection-side port. This can be realized in an especially simple manner and ensures the fast and reliable principle of operation of the compressed air supply system.

The primary valve and the secondary valve can be arranged in a separate branch line of a parallel connection in each case. The primary valve and the secondary valve can also be arranged in a common line section of a series connection. The primary valve and/or the secondary valve can be formed to be normally open or normally closed. Advantageously, especially in the case of a parallel connection, the primary valve and/or the secondary valve has a pressure limiter. A pressure limiter is suitable for avoiding system overload in the event of a failure. A primary valve and/or secondary valve developed in this way keeps a pneumatic connection closed up to a comparatively high limiting pressure, wherein the pressure limiter opens the primary valve and/or secondary valve only in the case of the comparatively high limiting pressure. Regardless of this, it is advantageous to maintain a residual pressure in the system for specific requirements. A residual pressure in the system can avoid collapsing of bellows in a pneumatic spring unit. For isolating the drier against the environment, especially when using a normally open primary valve and/or secondary valve, a residual pressure maintaining valve in the vent line is desirable.

A structural realization of the compressed air supply system in the form of a device with a housing arrangement, which has a number of sections, is particularly advantageous. A housing arrangement with a number of sections with regard to its geometric form can be adapted to the requirements in a vehicle in an especially flexible manner. A U-shaped construction is especially advantageous, i.e., a U-shaped construction in which two of the sections form in each case a side of the U-shaped construction and one of the sections forms a base. In particular, it is advantageous to arrange a drive in a first section, and/or to arrange the air compressor, which can be driven by the drive, in a second section and/or to arrange the air drier and the solenoid valve arrangement in a third section, which is connected to the second section via a pressure source interface. A flow can advantageously pass through the air drier via air passages of the third section. A flow direction is defined in the present case relative to a flow direction that exists when the pneumatic device is being filled via the air drier. For regeneration, flow advantageously passes through the air drier counter to the flow direction when filling.

In a preferred development, the solenoid valve arrangement is designed for the direct connection of a compressed air volume, that is, it has only the primary valve and secondary valve as valves. The solenoid valve arrangement is advantageously free of a control valve. In other words, the solenoid valve arrangement according to this development serves for realizing a directly controlled vent solenoid valve arrangement. As a result of a direct connection of an entire compressed air volume, the switching time of the directly controlled vent solenoid valve arrangement can lie below indirectly controlled vent solenoid valve arrangements if vent cross sections of equal sizes are assumed. As recognized by the development, this is advantageous for fast venting of the compressed air supply system and regeneration of the air drier with possibly high repetition rate.

Additionally, a first restrictor can be arranged in a pneumatic connection downstream of the air drier, i.e., on the compressed air connection side, in the filling direction. This restrictor, which is also to be referred to as a regeneration restrictor, advantageously has a comparatively small nominal diameter. As a result, a comparatively large pressure drop, i.e., a comparatively large pressure swing amplitude for regeneration of the air drier, can be provided. The first restrictor is preferably arranged in a compressed air supply line.

In one embodiment, a second restrictor is arranged upstream on the vent side of the air drier and upstream of the primary valve and/or a third restrictor is arranged upstream on the vent side of the air drier and upstream of the secondary valve. Via the second restrictor and third restrictor a nominal diameter of a vent line can be advantageously adapted for different functions. For example, in a first functional position during venting of the pneumatic device—by time-based sequential switching of the primary valve and secondary valve—excessive acoustics, especially a vent popping noise, can be avoided by the second and third restrictors. However, adequate regeneration of the air drier can already be ensured via the first restrictor. Advantageously, especially for this application case, at least one second restrictor and at least one third restrictor have a nominal diameter, which is larger than the nominal diameter of the first restrictor. In particular, at least the third restrictor has a nominal diameter that is larger than the nominal diameter of the first restrictor. As an exception, only the second restrictor can have a nominal diameter, which lies below the nominal diameter of the third restrictor, in order to ensure especially reduced acoustics, preferably for a high-pressure venting function, e.g., in order to vent only the air drier and the gallery. With all the foregoing embodiments, it is advantageously provided, moreover, that the sum of the nominal diameters of the second restrictor and third restrictor lie above the nominal diameter of the first restrictor.

In one embodiment, the nominal diameter of the first restrictor can be the largest nominal diameter, wherein flow can additionally pass through the first restrictor in a cycled manner, i.e., a passage of flow through the first restrictor takes place only with fast opening and closing thereof. In this way, in principle, the effective nominal diameter of the first restrictor, which is relevant for a throughflow, is lowered such that at least the sum of the nominal diameters of the second restrictor and third restrictor lies above the effective nominal diameter of the first restrictor.

The arrangement of the first restrictor in a compressed air supply line and the arrangement of the second restrictor and third restrictor in a vent line is advantageous.

In a second functional position, for example for lowering a vehicle, a substantially simultaneous opening of the primary valve and secondary valve can be advantageous, specifically on account of the then summed available nominal diameters of the second restrictor and third restrictor. This can lead to an undiminishably rapid lowering of the vehicle without excessive acoustics occurring or a regeneration of the air drier being disadvantageously influenced.

Within the scope of a preferred embodiment, the magnetic section, as a controller that acts upon the primary valve and the secondary valve, is designed commonly for the primary valve and secondary valve—e.g., in the form of a common coil former and/or control line that acts upon the two valves.

For this, a double-armature solenoid valve, in which the primary valve and the secondary valve can be formed together, is an especially suitable construction. In the most general sense, the primary valve and the secondary valve can be designed according to this development as one valve in a common housing, which has a primary armature carrying a first sealing element of the primary valve and a secondary armature carrying a second sealing element of the secondary valve, which armatures are arranged in a common coil former. The coil former and the armatures together form a coil within the limits of the magnetic section of the solenoid valve arrangement. In the case of a double-armature solenoid valve, e.g., with increasing control current, the primary armature and the secondary armature can advantageously be pulled in one after the other in a time-based sequential manner. In addition, a valve spring can be realized in the primary valve or secondary valve in each case with another, different spring force so that the valves can engage one after the other in a time-based manner, i.e., first the primary valve and then the secondary valve. By means of an adjustable control current, for which an armature pull-in force exceeds all the aforesaid spring forces, the primary valve and secondary valve can also be activated at the same time.

In another embodiment, the common controller of the magnetic section, which acts upon the primary valve and the secondary valve, has a control line that acts commonly upon a coil of the primary valve and a coil of the secondary valve for transmission of a control current. In principle, the coil can be a common coil for the primary valve and secondary valve, i.e., it can have a commonly formed coil former for the primary armature and secondary armature. In one variant, the primary valve and the secondary valve can have a separate coil in each case, i.e., principally, a separate coil former, wherein the coil formers are connected to a common electrical control line. In this case, the primary valve and the secondary valve are designed in the form of a single-armature solenoid valve in each case in a separate housing if necessary, wherein the individual-armature valves are connected to a common electrical control line. In both variants, the primary valve and the secondary valve can be advantageously activated in a time-based sequential manner by means of an increasing control current in the common electrical control line. In both variants, the primary valve and the secondary valve can be activated at the same time by a sufficiently high control current being made available in the common control line.

In summary, a primary valve and/or secondary valve can be activated both by means of suitably designed valve springs for the armatures and by means of suitably designed control currents for a coil, or for a plurality of coils, of the valves.

According to one embodiment, a desiccant container of the air drier has a wall that forms a desiccant-free recess, wherein the solenoid valve arrangement is arranged at least partially inside the recess; preferably, it is arranged completely inside the recess. As a result, a space saving and well protected accommodation of the solenoid valve arrangement is realized and, moreover, is beneficial to the drier function and to the valve function.

In a method according to an embodiment of the present invention, the primary valve and the secondary valve of the solenoid valve arrangement are designed to be activated in a first operating mode in a time-based sequential manner by a control current increasing above a current amplitude. To this end, it can be provided that the control current first of all exceeds only a control amplitude for activating the primary valve and then remains within a range that only keeps the primary valve activated, whereas the secondary valve is not activated. At a later time point, the control current can exceed a second current amplitude that is sufficient to also activate the secondary valve. Then, the control current can have a current amplitude that is sufficient to keep both the primary valve and the secondary valve in the activated state. For deactivating the secondary valve and primary valve, a control current, if necessary with a known hysteresis, can be reduced below the current amplitudes. In a second operating mode, the control current can increase comparatively quickly to a current amplitude that lies above a current amplitude that is sufficient to activate the primary valve and the secondary valve at the same time. To this end, the current amplitude should lie above the largest current amplitude for activating the primary valve and secondary valve.

An activation of the primary valve and/or secondary valve can be carried out especially for releasing air from an air bellows. Compressed air can be directed in an air flow through the pneumatic line accordingly. An activation of a primary valve or secondary valve can be carried out in accordance with a level state control of the vehicle, for example. To this end, provision can be made for an air mass control facility, for example, which is associated with a level state setting and controls a volumetric flow through the pneumatic line. An activation of the primary valve and/or secondary valve can also be carried out in a time-controlled manner. A time control is recommended, for example, when a level state signal is excessively noisy. A time-controlled activation of the primary valve and secondary valve can also be carried out within the scope of a regeneration cycle for the compressed air supply system, for example.

Still other objects and advantages of the present invention will in part be obvious and will in part be apparent from the specification.

The present invention accordingly comprises the features of construction, combination of elements, arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

Exemplary embodiments of the present invention are described in greater detail with reference to the appended drawings, in which.

LIST OF REFERENCE DESIGNATIONS

Figure 1A:
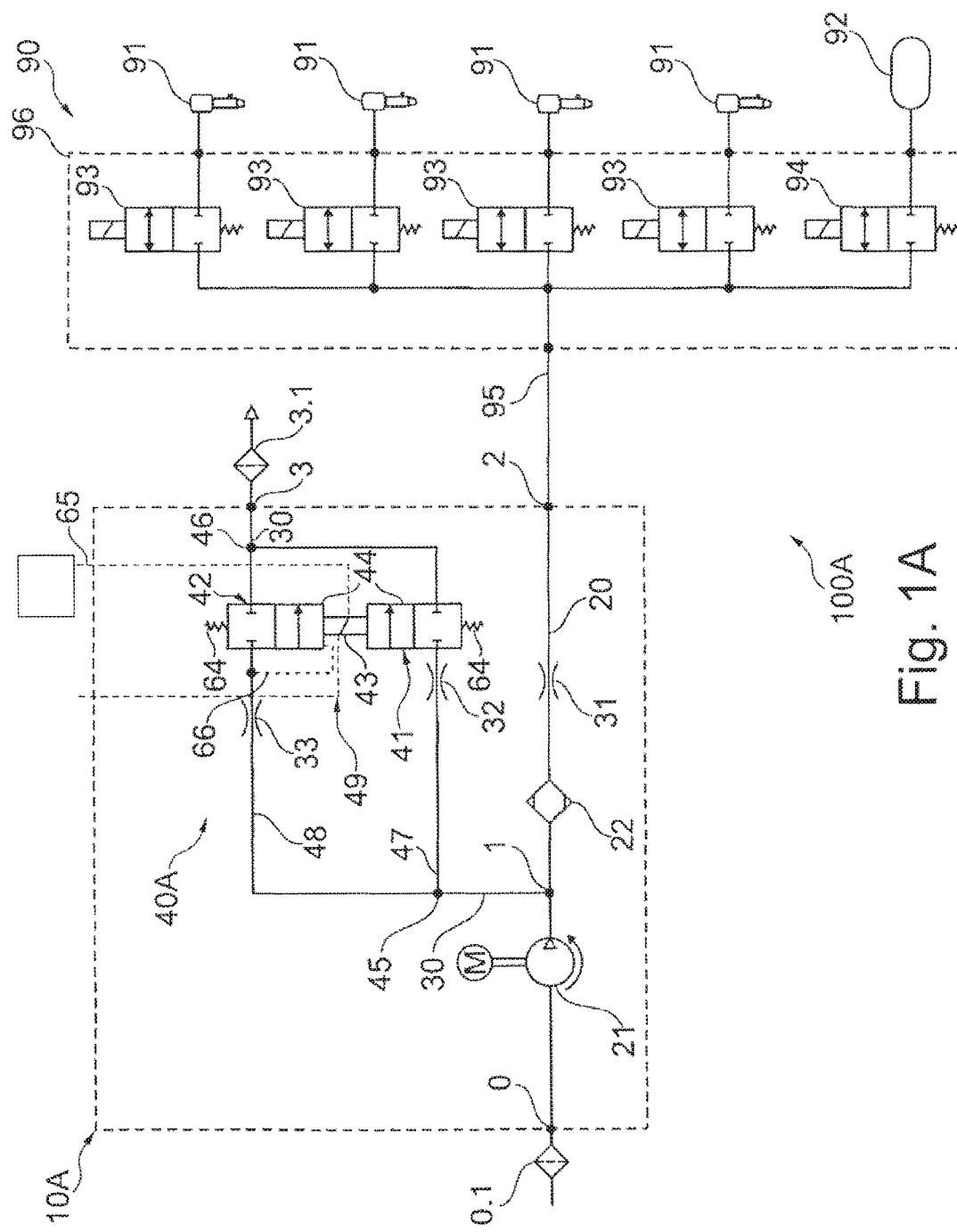
FIGS. 1A-1D are circuit diagrams of a pneumatic system with a pneumatic spring unit and a compressed air supply system according to four exemplary embodiments of the present invention, specifically with a primary valve and a secondary valve of a solenoid valve arrangement—preferably as a double-armature solenoid valve—which, normally closed, are connected in parallel (A) or in series (B), or, normally open, are connected in parallel (C) or in series (D)

0 Air feed
0.1 Filter
1 Compressed air feed
2 Compressed air port
3 Vent port
3.1 Filter
10; 10A, 10B, 10C, 10D Compressed air supply system
20 Compressed air supply line
21 Air compressor
22 Air drier
30 Vent line
31 First restrictor
32, 32' Second restrictor
33 Third restrictor
40.1, 40.2, 40A, 40B, 40C, 40D Solenoid valve arrangement
41 Primary valve
42 Secondary valve
43 Magnetic section
44 Pneumatic section
45 Inlet-side or compressed air connection-side pneumatic port
46 Outlet-side or vent-side pneumatic port
47 First branch line
47' Separate line section, bypass for the vent line 30
48 Second branch line
48' Line section of the vent line 30
49 Controller
50 Housing arrangement
51 First section
52 Second section
53 Third section
54 Compression chamber
55 Piston
56 Shaft and connecting rod
57 Outlet valve
58 Desiccant container
61A First sealing element
61B Primary armature
61C First valve seat
62A Second sealing element
62B Secondary armature
62C Second valve seat
63 Coil former
64 Valve spring
65 Control line
66 Pressure limiter
67 Residual pressure maintaining valve
68 Winding
69 Armature guide tube
90 Pneumatic device
91 Bellows
92 Accumulator
93 Solenoid valve, level control valve for bellows
94 Solenoid valve, level control valve for accumulator
95 Gallery
96 Valve block
100, 100A, 100B, 100C, 100D Pneumatic system
A First housing section
B Second housing section
C Third housing section
D Seal
T Cover
E0 Air feed connection point, interface
E1 Pressure source connection point, interface
E2 Compressed air supply connection point, interface
E3 Vent connection point, interface
S Control connection point, interface
F Spring
Recess
M Motor
P Vent flow
$\bar{p}$ Supply flow
pSp Accumulator final pressure
pB Bellows pressure
p1, p0 Pressure level/residual pressure
IS, IS1, IS2 Switching current
IH, IH1, IH2 Holding current
W Wall
X Detail
Y Axis of air drier and double-armature solenoid valve

DETAILED DESCRIPTION OF THE PREFERRED EMBODIMENTS

FIGS. 1A to 1D show, in each case, a pneumatic system 100A, 100B, 100C, 100D with a compressed air supply system 10A, 10B, 10C, 10D and a pneumatic device 90 in the form of a pneumatic spring unit. In the drawing figures, the same designations are expediently used for identical or similar parts, or parts of identical or similar function. The pneumatic spring unit has bellows 91, four in number, which, in each case, are allocated to a wheel of a vehicle, and also an accumulator 92 for the storage of readily available compressed air for the bellows 91. The bellows 91 and the accumulator 92, in the present case in a valve block 96 of five valves, are connected in each case via a normally closed solenoid valve 93, 94—as a bellows valve for the bellows 91 or as an accumulator valve for accumulator 92—to a common pneumatic line, which forms a gallery 95 and which also forms the pneumatic connection between the compressed air supply system 10A, 10B, 10C, 10D and the pneumatic device 90. The valve block 96, in a modified embodiment, can have other solenoid valves or fewer solenoid valves, e.g., it can have solenoid valves arranged in a double valve block. Any type of collecting line, from which project branch lines to bellows 91 and/or to an accumulator 92 and/or to the compressed air supply system 10A, 10B, 10C, 10D, is to be understood to be a gallery in the most general sense.

The compressed air supply system 10A, 10B, 10C, 10D serves for operating the pneumatic device 90 in the form of the pneumatic spring unit and supplies the gallery 95 thereof via a compressed air port 2. The compressed air supply system 10A, 10B, 10C, 10D furthermore has a vent port 3 and an air feed 0 with an air intake. The pneumatic spring unit with the controllable solenoid valves 93, 94 is arranged downstream of the compressed air port 2 in the filling direction. A filter 3.1 or 0.1 is connected downstream to the vent port 3 in the venting direction or connected upstream to the air feed 0 opposite the filling direction in each case.

In a pneumatic connection between air feed 0 and compressed air feed 1, the compressed air supply system 10A, 10B, 10C, 10D furthermore has a compressed air generator in the form of a compressor 21, which—driven via a motor M—is provided with compressed air for supplying the compressed air feed 1. In addition, an air drier 22 and a first restrictor 31, in this case as a regeneration restrictor, are arranged in a pneumatic connection between compressed air feed 1 and compressed air port 2. The filter 0.1, the air feed 0, the air compressor 21, the compressed air feed 1, the air drier 22 and the first restrictor 31 are arranged together with the compressed air port 2 in a compressed air supply line 20 in this sequence, which forms the pneumatic connection to the gallery 95.

A vent valve arrangement in the form of a controllable solenoid valve arrangement 40A, 40B, 40C, 40D with a magnetic section 43 and a pneumatic section 44 for discharging air to the vent port 3 is accommodated in a pneumatic connection between compressed air feed 1 and vent port 3 of the compressed air supply system 10A, 10B, 10C, 10D. The solenoid valve arrangement 40A, 40B, 40C, 40D is arranged in a vent line 30, which forms the pneumatic connection. The pneumatic section 44 of the solenoid valve arrangement 40A, 40B, 40C, 40D has a primary valve 41 and a secondary valve 42.

Figure 1B:
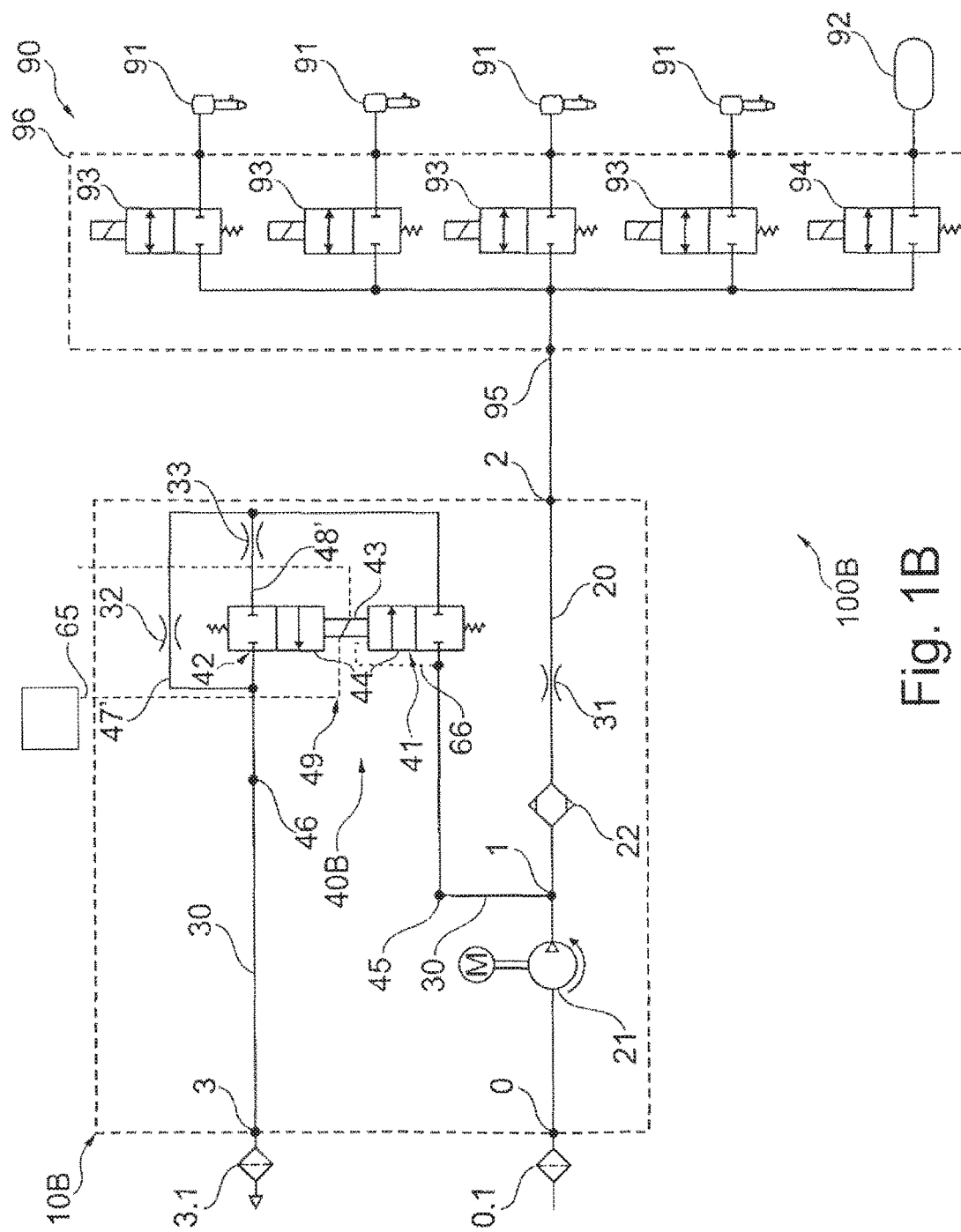
Figure 1C:
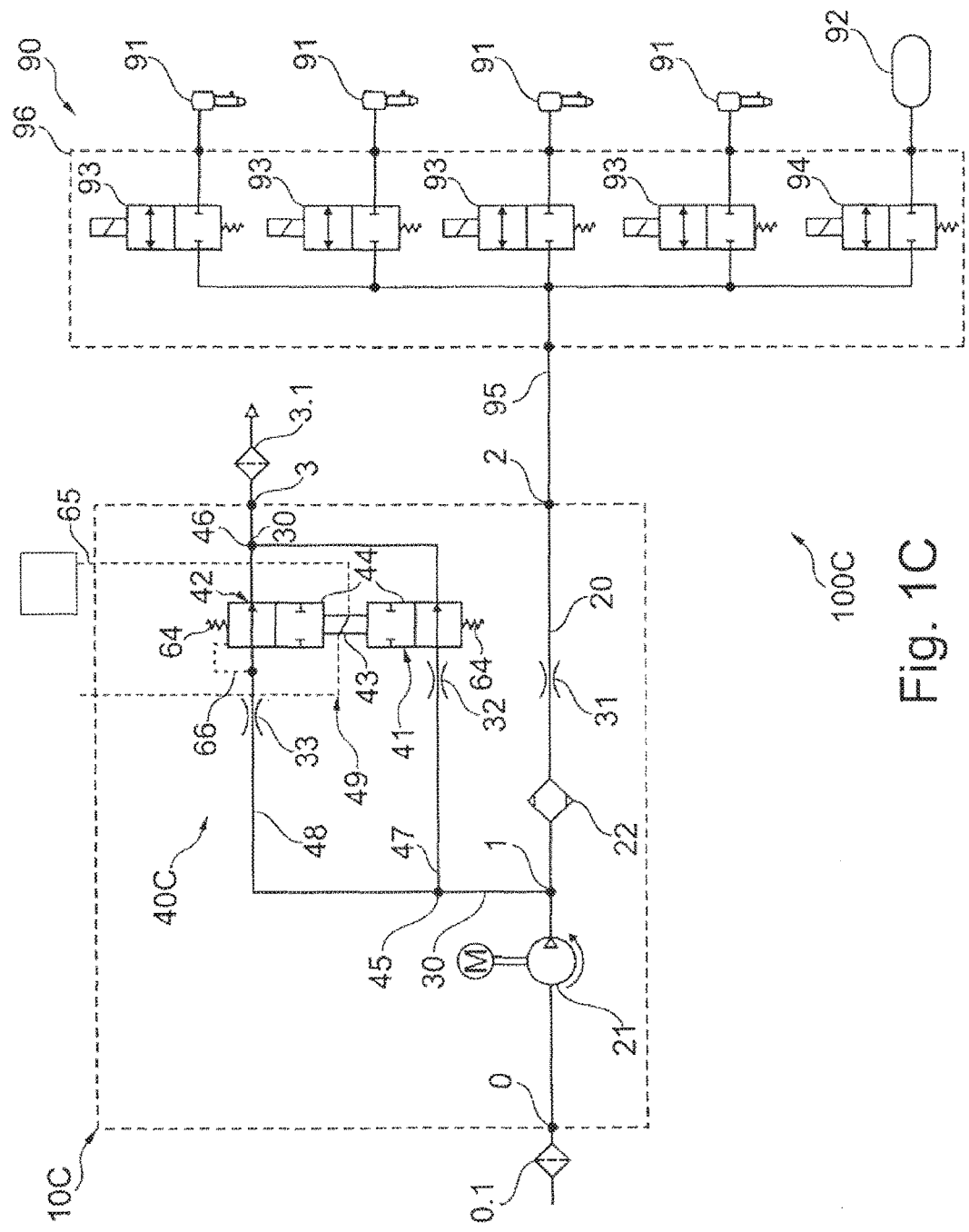
Figure 1D:
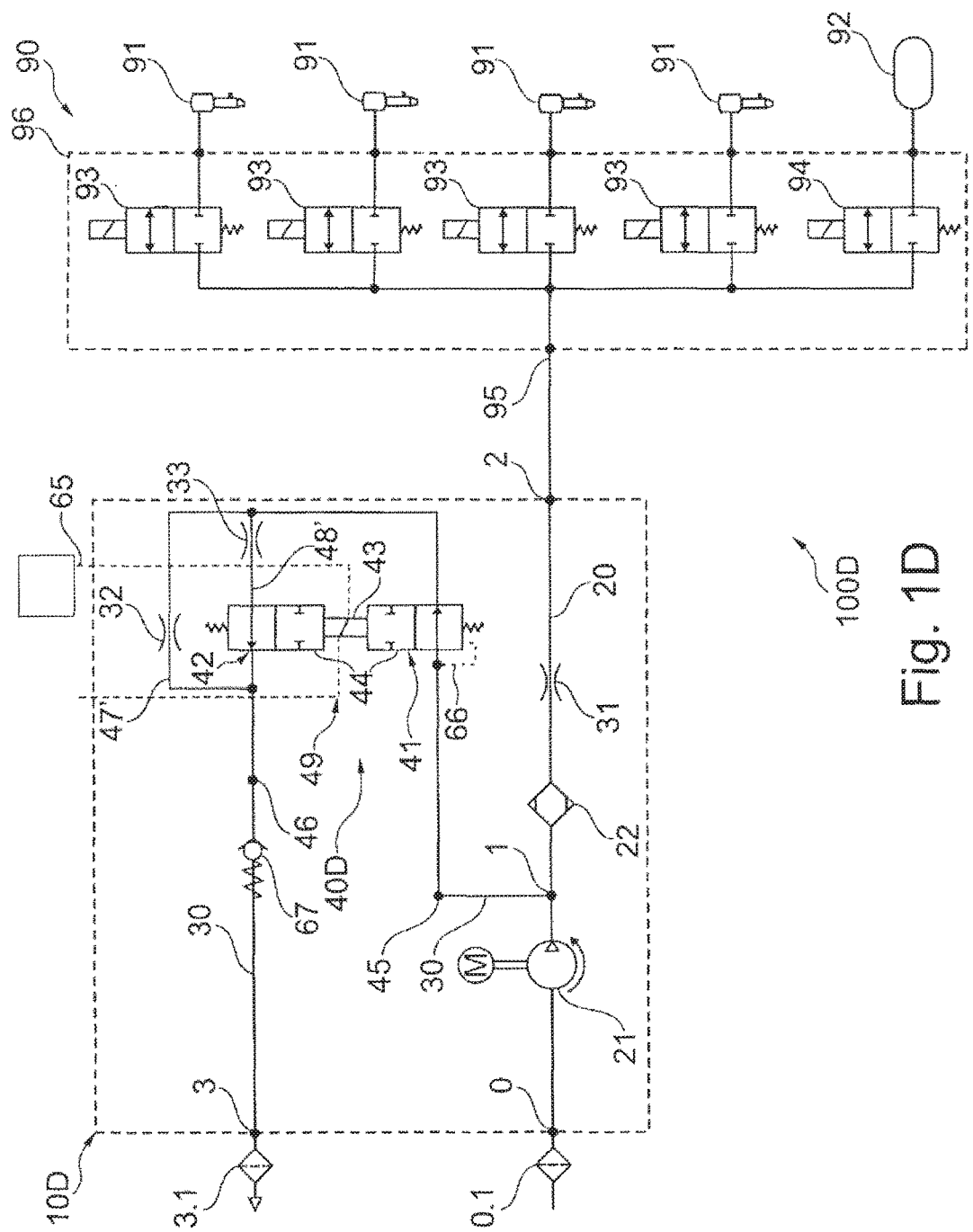

In the embodiment of FIG. 1A, a primary valve 41 and a secondary valve 42 are designed as normally closed solenoid valves and are connected in parallel. In the embodiment of FIG. 1C, a primary valve 41 and a secondary valve 42 are designed as normally open solenoid valves and are connected in parallel. In the embodiment of FIG. 1B and FIG. 1D, a primary valve 41 and a secondary valve 42 are connected in series—being normally closed in FIG. 1B and normally open in FIG. 1D.

The solenoid valve arrangement 40A, 40B, 40C, 40D has a single pneumatic compressed air connection-side port 45 on the inlet side and a single pneumatic vent-side port 46 on the outlet side. Advantageously, a compressed air connection-side line section of the vent line 30—that is, upstream of the compressed air connection-side port 45—is connected to the pressure source 1 for the pneumatic connection of the solenoid valve arrangement 40A, 40B, 40C, 40D to the compressed air supply line 20. This, in the case of venting of the compressed air supply system 10A, 10B, 10C, 10D via the vent line 30, results in the venting of compressed air, which is extracted upstream of the air drier 22, upstream in the filling direction, that is,—in simple terms—undried air.

In concrete terms, in the case of the parallel connections of the solenoid valve arrangement 40A, 40C in FIG. 1A and FIG. 1C, the primary valve 41 and the secondary valve 42 are connected in each case between two pneumatic ports 45, 46, which are common to the primary valve 41 and to the secondary valve 42. In the present case, therefore, two pneumatic chambers, which are common to the primary valve 41 and secondary valve 42, are formed in the vent line 30—formed in each case by means of line sections of the vent line 30 between the compressed air feed 1 and solenoid valve arrangement 40A, 40C on one side and between the solenoid valve arrangement 40A, 40C and the vent port 3 on the other side. A pneumatic port 45 for the compressed air feed 1 and a pneumatic port 46 for the vent port 3 therefore serve in a single common line—specifically, in the vent line 30 in this case—for forming two pneumatic chambers that are common to the primary valve 41 and to the secondary valve 42.

Between the primary valve 41 and the compressed air connection-side port 45 provision is made for a second restrictor 32. Between the secondary valve 42 and the compressed air connection-side port 45 provision is made for a third restrictor 33. In the case of the parallel connections of the solenoid valve arrangement 40A, 40C, the second restrictor 32, as well as the primary valve 41, are arranged in a first branch line 47 of the vent line 30 between the ports 45, 46. The third restrictor 33, as well as the secondary valve 42, are arranged in a second branch line 48 of the vent line 30 between the ports 45, 46. The first branch line 47 and second branch line 48 together lead, in each case, into the vent line 30 at the common port 45 and at the common port 46, respectively. The second restrictor 32 and third restrictor 33 in this respect form a vent restrictor in each case.

In the case of the series connections of the solenoid valve arrangement 40B, 40D in FIG. 1B and FIG. 1D, the second restrictor 32 is arranged in a separate line section 47' of the vent line 30—as a bypass for the second valve 42 parallel to the line section 48' of the vent line 30—between port 46 and primary valve 41. The third restrictor 33 is arranged in the line section 48' of the vent line 30 between the primary valve 41 and the secondary valve 42.

In principle, in all cases, the first, second and third restrictors 31, 32, 33, by means of line constrictions, fine opening cross sections or the like can be formed integrally with a line. The second restrictor 32 and third restrictor 33 can also be formed additionally or alternatively by means of a nominal diameter of a valve seat. The first, second and third restrictors 31, 32, 33 can also be formed additionally or alternatively by means of a separate component in the compressed air supply line 20 or in the vent line 30.

In the case of the parallel connections of the solenoid valve arrangement 40A, 40C in FIG. 1A and FIG. 1C, the primary valve 41 of the solenoid valve arrangement 40B, 40D and the secondary valve 42 of the solenoid valve arrangement 40A, 40C are provided with a pressure limiter 66 in each case. In the present case, for pressure limiting when sensing a line pressure, a valve spring 64—shown here only symbolically and in more detail in FIG. 5—and a primary armature 61B or secondary armature 62B of the primary valve 41 or of the secondary valve 42 act together. Pressure limiting keeps the air drier closed up to a comparatively high pressure. Overloading of a pneumatic device in the event of a malfunction, as can be created by means of a sticking relay, for example, i.e., a non-disengaging relay for the motor of the air compressor 21, is consequently avoided.

In the case of the compressed air supply system 10D with a series connection of normally open primary valve 41 and secondary valve 42 of the solenoid valve arrangement 40D in FIG. 1D, a residual pressure maintaining valve 67 is also provided in a vent line 30. For each of the described compressed air supply systems 10A, 10B, 10C, 10D—especially compressed air supply system 10B with normally open primary valve 41 and secondary valve 42—an optional residual pressure maintaining function basically serves to prevent the collapse of bellows 91 of a pneumatic device 90 in specific cases. Such a case can occur, for example, after setting down a vehicle from a lifting platform, during which it may be periodically necessary that a certain residual pressure remains in the bellows 91.

The magnetic section 43 of the solenoid valve arrangement 40A, 40B, 40C, 40D in the present case comprises a common controller 49 of the magnetic section 43 that acts equally upon the primary valve 41 and the secondary valve 42, by which both the primary valve 41 and the secondary valve 42 can be activated.

In the present case, the controller 49 of the magnetic section 43, which acts in common upon the primary valve 41 and the secondary valve 42, is formed by a common coil former 63 and control line 65, which act upon both valves. As part of the common controller 49, the coil in FIG. 1A to FIG. 1D is represented symbolically as the magnetic section 43 for the pneumatic section 44 of a double-armature solenoid valve. Advantageous embodiments are shown in FIGS. 5 to 8. In another embodiment, a modified controller can comprise the common control line 65 for the primary valve 41 and secondary valve 42 for transmitting a different control current for the primary valve 41 and secondary valve 42, wherein common coils for both valves or separate coils can be provided.

A modification of the common controller 49, uses the common control line 65 especially for a threshold control current, which is set differently for the primary valve 41 and the secondary valve 42. In this way, valves that are also designed as single-armature solenoid valves—i.e., with separate coils of a solenoid valve arrangement in each case—can be operated at the same time or sequentially after reaching a respective threshold control current. In other words—regardless of the chosen embodiment or modification—the controller 49 of the magnetic section 43, which acts in common upon the primary valve 41 and the secondary valve 42, is designed such that the primary valve 41 and the secondary valve 42 can be selectively activated at the same time or in sequence.

From the representation of the embodiment of FIGS. 1A to 1D, it can already be seen that the compressed air supply system 10A, 10B, 10C, 10D is provided with a solenoid valve arrangement 40A, 40B, 40C, 40D in the form of a directly controlled vent solenoid valve arrangement with which direct control of the overall compressed air volume is possible. In the present case, the solenoid valve arrangement 40A, 40B, 40C, 40D provides only the primary valve 41 and the secondary valve 42 in each case as vent valves in the vent line 30; a control valve is not necessary in either case. The embodiment as a directly controlled vent solenoid valve arrangement allows fast and flexible venting of the pneumatic device 90 or of the compressed air supply system 10A, 10B, 10C, 10D without an additional and possibly delaying control valve. Furthermore, this embodiment enables an advantageous saving of components and installation space. Also, practically no demands upon a minimum pre-control pressure for operating the compressed air supply system 10A, 10B, 10C, 10D are necessary. As a result, a flexible principle of operation with regard to the air drier 22 can also be realized.

In the solenoid valve arrangement 40A, 40B, 40C, 40D, the primary valve 41 is provided with a smaller nominal diameter than the secondary valve 42. Additionally or alternatively, the nominal diameter of the first restrictor 31, which is relevant to the pneumatic operation, in proportion to the nominal diameter of the second restrictor 32 and in proportion to the nominal diameter of the third restrictor 33 is organized such that a nominal diameter of the first restrictor 31 lies in any case below the sum of the nominal diameters of the second restrictor 32 and third restrictor 33. The nominal diameter sum of the second 32 and third restrictor 33 preferably lies above twice the nominal diameter of the first restrictor 31. The third restrictor 33 can have the largest nominal diameter or a nominal diameter of average size, i.e., between that of the first restrictor 31 and second restrictor 32. The nominal diameter of the second restrictor 32 can have an average nominal diameter between the first restrictor 31 and the third restrictor 33 or can have the smallest nominal diameter. The latter is especially necessary in order to reduce as effectively as possible a vent popping noise by means of the restrictor 32. In principle, this nominal diameter organization has the advantage—depending upon the aim of the venting—that an opening of equal or different nominal diameters in the vent line 30 of the compressed air supply system 10A, 10B, 10C, 10D can be carried out at the same time or sequentially.

Figure 2A:
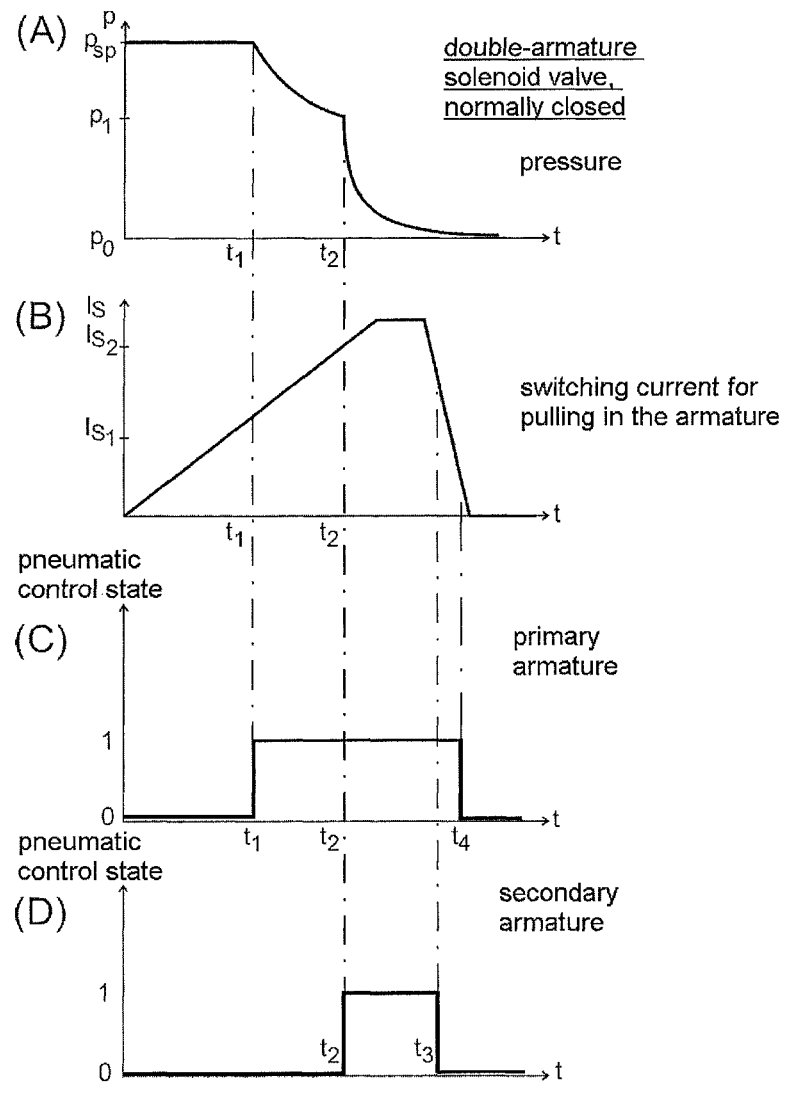
FIG. 2A is a graph in relation to control states of a primary valve and secondary valve of a normally closed double-armature solenoid valve with associated control currents for the valves and also pressures in a vent line.
Figure 2B:
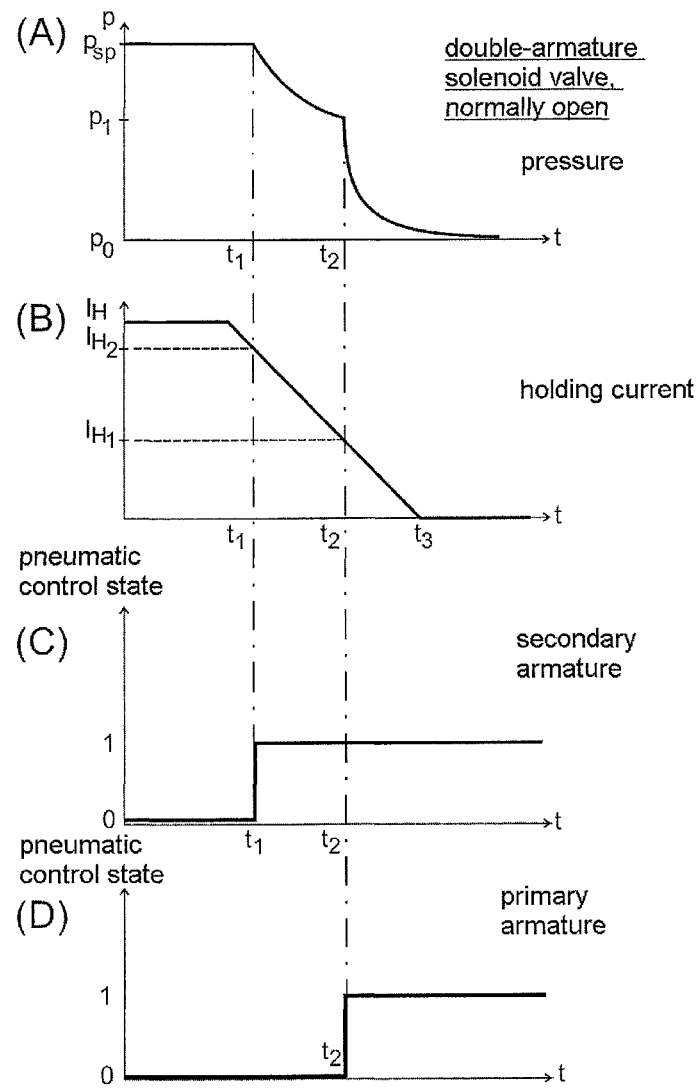
FIG. 2B is a graph similar to FIG. 2A for a normally open double-armature solenoid valve.

With reference to FIG. 2A and FIG. 2B—regardless of the constructional realization of the common controller 49, which acts upon the primary valve 41 and the secondary valve 42, the primary valve 41 and the secondary valve 42 can be operated at the same time or sequentially—for example by different settings of spring forces of valve springs 64 or by setting different threshold currents within a specified range.

In principle—as explained in detail below—the primary valve 41 and the secondary valve 42 of the solenoid valve arrangement 40.1, 40.2, 40A, 40B, 40C, 40D in a first operating mode can be activated in a time-based sequential manner by a control current that first crosses a first threshold value and then, after an operation-dependent period of time, by a control current that crosses a second threshold value. A switching current $I_S$ according to FIG. 2A and a holding current $I_H$ according to FIG. 2B are to be understood to be a control current. Correspondingly, a first switching current $I_{S1}$ or holding current $I_{H1}$ or a second switching current $I_{S2}$ or holding current $I_{H2}$ are to be understood to be a threshold value. In principle, additionally or alternatively, the primary valve 41 and the secondary valve 42 of the solenoid valve arrangement 40.1, 40.2, 40A, 40B, 40C, 40D in a second operating mode can be activated at the same time by a control current that crosses a threshold value, activating both the primary valve 41 and the secondary valve 42. The control current is selected in this case as a switching current $I_S$ or holding current $I_H$ such that all the threshold values, i.e., a first switching current $I_{S1}$ or holding current $I_{H1}$ and a second switching current $I_{S2}$ or holding current $I_{H2}$, are crossed at the same time.

Preferably, by means of the controller 49, which acts upon primary valve 41 and secondary valve 42 during the crossing of a first threshold value, i.e., $I_{S1}$, $I_{H1}$, operation of a first vent restrictor in the form of the second restrictor 32—alternatively in the form of the third restrictor 33—in the vent line 30 can consequently be achieved. Especially preferably, during the crossing of a second threshold value, i.e., $I_{S2}$, $I_{H2}$, operation of a second vent restrictor in the form of the third restrictor 33—alternatively in the form of the second restrictor 32—in the vent line 30 can consequently additionally be achieved.

The additionally provided nominal diameters of the second restrictor 32 and third restrictor 33, adapted to the nominal diameters of the primary valve 41 and second valve 42, allow, moreover, an advantageous venting while avoiding vent popping noise, which can occur when an excessively large compressed air volume under extremely high pressure is vented in a short space of time. A regeneration of the air drier 22, at a pressure level that is designed depending upon function, is ensured as a result of the comparatively small nominal diameter dimension of the first restrictor 31 in relation to at least one of the restrictors 32, 33. Consequently, a sufficiently large pressure drop can be realized at the first restrictor 31 during operation and is used for transporting away moisture in the air drier 22. It is advantageous to design a dimension of the nominal diameter of the third restrictor 33 or of the second restrictor 32 as large as possible in relation to the nominal diameter of the first restrictor 31.

The larger the nominal diameter dimension, the better the regeneration of the air drier 22. Consequently, a comparatively large pressure drop, and therefore a sufficiently high pressure swing amplitude, can be realized in an improved manner. In order to also realize, moreover—in addition to an optimum regeneration—optimized acoustics for venting or regeneration, especially to avoid a vent popping noise, this embodiment makes provision for a second restrictor 32. In the present case, this has an advantageously optimized nominal diameter, which supplements the function of the first restrictor 31 and the third restrictor 33. To this end, this can lie between the nominal diameter of the first restrictor 31 and that of the third restrictor 33. This is advantageous particularly in the case of compressed air supply systems for use in an SUV. If necessary, the nominal diameter of the second restrictor 32 can even lie below the nominal diameter of the first restrictor 31. In the case of both modifications, but at least in the case of the latter, the nominal diameter of the third restrictor 33 is advantageously the largest.

For this, the nominal diameter design of the restrictors 31, 32, 33 may be explained with reference to two examples. In both cases, a nominal diameter dimension for the second restrictor 32 is limited towards the top end since during venting the risk of a vent popping noise otherwise exists. Also, a nominal diameter dimension of the second restrictor 32 is limited towards the bottom end since it is otherwise not possible, with the air compressor 21 in operation, to still lower the pressure in the compressed air supply system 10A, 10B, 10C, 10D via the second restrictor 32. In both examples, this leads to a nominal diameter of the second restrictor 32 needing to lie not below 1.0 mm and not above 1.4 mm. As a further condition in the two examples, it is predetermined that the sum of the nominal diameters of the second restrictor 32 and of the third restrictor 33 is greater than twice the nominal diameter of the first restrictor 31.

This relates to a first example of a nominal diameter design, which is advisably at comparatively high pressure for venting. The nominal diameter of the first restrictor can be designed for an optimized regeneration of the air drier 22. An air drier 22 filled with compressed air constitutes a significant part of a compressed air volume. Furthermore, the nominal diameter of the first restrictor 31 decisively influences a lowering of the vehicle by means of discharging air from the bellows 91, which limits a nominal diameter dimension of the first restrictor 31 towards the bottom end. With a fixed nominal diameter dimension of the first restrictor 31, balancing drier regeneration and lowering function, the nominal diameters of the second 32 and third restrictor 33, as specified above, are applied in the present case in an optimized manner to the nominal diameter of the first restrictor 31. Consequently, lowering of a vehicle by emptying the air drier 22 and also its regeneration can be carried out with a comparatively large sum of the nominal diameters of the second restrictor 32 and of the third restrictor 33. As a result, the nominal diameter of the first restrictor 31 can then be designed as small as possible in relation to the sum of the nominal diameters of the second restrictor 32 and of the third restrictor 33.

In case the nominal diameter of the second restrictor serves especially for reducing a vent popping noise during a "filling termination action", the nominal diameter of the second restrictor 32 can be geared exclusively to the acoustics in practice. To this end, the restrictor 32 can assume the function of a high-pressure vent valve. In this example, the nominal diameter of the first restrictor can amount to 3.2 mm, for example, and the sum of the nominal diameter of the second restrictor 32 and the nominal diameter of the third restrictor 33 equals at least twice the nominal diameter of the first restrictor 31. On account of the limiting of the nominal diameter of the second restrictor 32 towards the top end, in the present case to a value of below 1.4 mm in order to reliably avoid a vent popping noise, for this case the nominal diameter of the third restrictor 33 is preferably very large, specifically at least 5 mm, so that the nominal diameter sum is greater than twice the nominal diameter of the first restrictor 31. In this case, the nominal diameter of the second restrictor 32 therefore lies considerably below the nominal diameter of the first restrictor 31.

In the second example, for an improved regeneration of the air drier 22, the nominal diameter of the first restrictor 31 can be selected to be significantly smaller, for example 0.8 mm. In this case, taking into consideration the advantageous nominal diameter range for the second restrictor 32 of between 1.0 and 1.4 mm, the nominal diameter of the second restrictor 32 can be selected to be larger than the nominal diameter of the first restrictor 31, for example 1.4 mm. In order to nevertheless ensure a venting which is as effective as possible, the nominal diameter sum of the second and third restrictors is again to be selected to be greater than twice the nominal diameter of the first restrictor 31. For the second example, the nominal diameter of the third restrictor 33 can then be selected to be greater than 0.7 mm. The latter dimension can be produced comparatively simply and is sufficiently unsusceptible to contamination. It is advantageous in the present case to select the nominal diameter of the third restrictor 33 to be similar to the nominal diameter of the second restrictor 32, that is, 1.4 mm, for example.

In the foregoing examples, a primary valve 41 with associated second restrictor 32 serves primarily for a high-pressure venting function and a secondary valve 42 with associated third restrictor 33 serves primarily for a residual venting function, wherein an optimized regeneration of the air drier 22 is nevertheless ensured. Furthermore, the selection of the nominal diameter of the first restrictor 31 guarantees an optimized regeneration of the air drier 22, yet with the best lowering function for a vehicle.

It should be appreciated that with the present arrangement and the described nominal diameter relationships of the first, second and third restrictors 31, 32, 33, a vent popping noise is reliably avoided and improved regeneration of the air drier 22 can nevertheless be carried out. The arrangement of the second restrictor 32 in a vent line 30—i.e., in the case of a parallel connection, in a first branch line 47 of the vent line 30 or, in the case of a series connection, between primary valve 41 and port 46 in the separate line section 47' as a bypass—is particularly advantageous. In the case of a series connection of a primary valve 41 and secondary valve 42, the nominal diameter sum of the second restrictor 32 and third restrictor 33 is always greater than the nominal diameter, preferably twice the nominal diameter, of the first restrictor 31. The selection of the nominal diameter of the first restrictor 31 as the smallest nominal diameter is especially advantageous.

For venting the compressed air supply system 10A, 10B, 10C, 10D after achieving the final accumulator pressure, i.e., upon achieving the accumulator filling termination, the second restrictor 32 is dimensioned such that a compressed air content—under high pressure—of the air drier 22 is discharged quietly into the environment. The following embodiments refer to a compressed air supply system 10A, 10C with a parallel connection of primary valve 41 and secondary valve 42, but it should be understood that the inventive concepts are not limited to such construction and can also apply to a compressed air supply system 10B, 10D, for example.

For the description of an exemplary operation of a compressed air supply system 10A, 10B with normally closed solenoid valve arrangement 40A, 40B, reference is made to FIG. 2A. The compressed air feed 1 is supplied by drawing in air via the filter 0.1 and the air feed 0 is supplied with compressed air by the air compressor 21, driven via the motor M, compressing the drawn-in air. The pneumatic device 90 in the form of the pneumatic spring unit is supplied with compressed air from the compressed air feed 1 via the air drier 22 and the first restrictor 31. To this end, the compressed air supply line 20 of the compressed air supply system 10A, 10C is connected via the compressed air port 2 to the gallery 95 in the valve block 96 of the pneumatic device 90.

For possible venting of the bellows 91 with a bellows pressure $p_B$, a primary valve 41 and a secondary valve 42 of the compressed air supply system 10A, 10B are usually fully opened and only then is a solenoid valve 93, as a level control valve for a bellows 91, energized. This has been the solution with lowest noise up to now for venting the bellows 91. In principle, however, the description of switching states—illustrated in FIG. 2A—of a primary valve and secondary valve can apply to any type of termination of a filling process, especially of a bellows filling process with a different starting pressure level in each case. A bellows pressure $p_B$ lies within the range of between about 5 and 10 bar, for example. The switching states with regard to the termination of a filling process for an accumulator 92 is described hereinafter.

Upon achieving the accumulator final pressure in the pneumatic device 90—in the present case within a pressure range $p_{Sp}$ of between about 15 and 20 bar in the accumulator—the compressed air supply system 10A, 10B can be vented, as shown in FIG. 2A(A).

As shown in FIG. 2A(A), the compressed air supply system 10A, 10B, after achieving the accumulator final pressure $p_{Sp}$, i.e., upon achieving the compressor filling termination—be it time or pressure controlled—can be vented at time point $t_1$ by opening the primary valve 41 with relatively small nominal diameter and by using the second restrictor 32 to reduce the comparatively high internal pressure $p_{Sp}$ of the air drier 22, which is achieved upon termination of accumulator filling. This venting—as evident from FIG. 2A(A)—can be carried out in a first step until the reduction of the pressure to a pressure level $p_1$, after which, at time point $t_2$, faster venting with greater nominal diameter is possible without vent popping noise. The first venting step can advantageously be carried out with the air compressor 21 in operation. Inter alia a pressure level $p_1$ is maintained in the pneumatic device 90, which is advantageous with regard to a currently described pneumatic spring unit.

With the air compressor 21 stopped, at time point $t_2$, a residual venting from the pressure level $p_1$ to a residual pressure $p_0$, e.g., to atmospheric pressure, can then be carried out in a second venting step. Depending upon requirement, this can be carried out by opening the secondary valve 42 and by using the third restrictor 33 or advantageously by opening both the primary valve 41 and the secondary valve 42, i.e., by adding the secondary valve 42 to the primary valve 41. The second venting—the residual venting—is therefore carried out very quickly with comparatively large nominal diameter of the overall solenoid valve arrangement 40A, 40B with the restrictors 32, 33 without a vent popping noise occurring.

Figure 5:
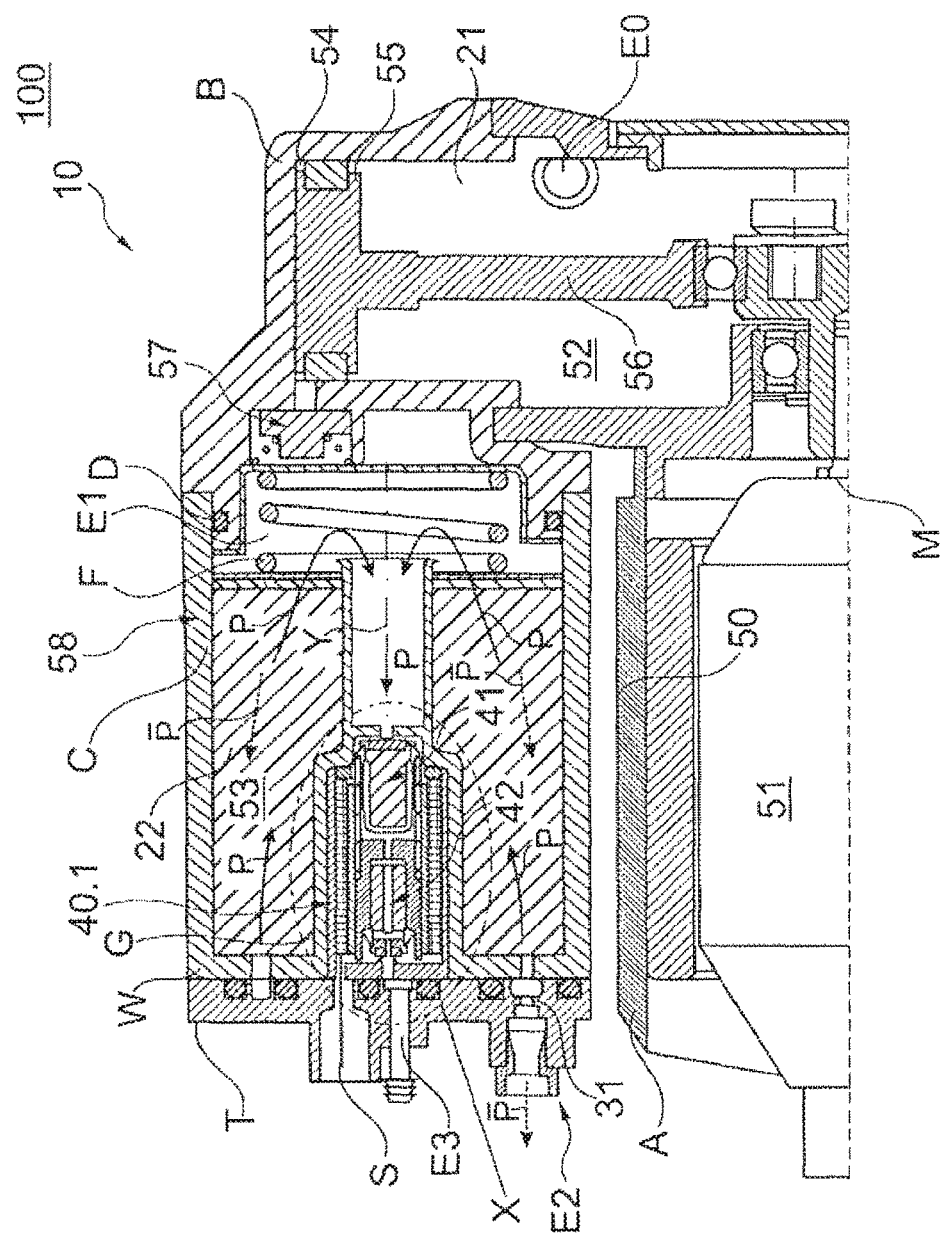
FIG. 5 shows an embodiment of a compressed air supply system for use in a pneumatic system according to FIG. 1B with a solenoid valve arrangement in the form of a double-armature solenoid valve, in which the primary valve and the secondary valve are connected in series.
Figure 6:
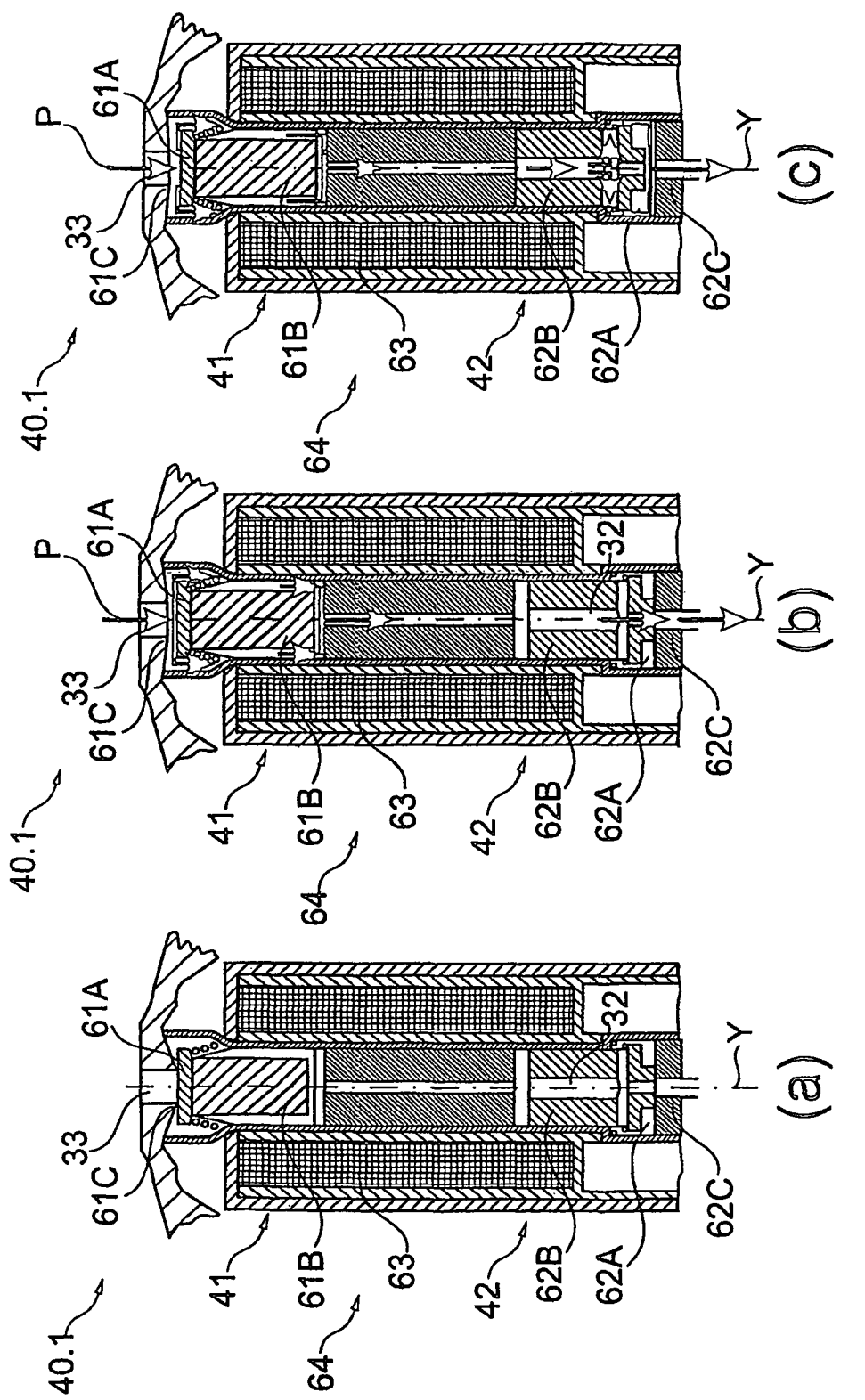
FIG. 6 shows a view of three functional positions of the primary valve and of the secondary valve of a solenoid valve arrangement of the compressed air supply system of FIG. 5, specifically a position (a) which is normally closed on both sides, a position (b) which is energized open on the primary side and restricted on the secondary side, and a position (c) which is energized open on both sides.
Figure 7:
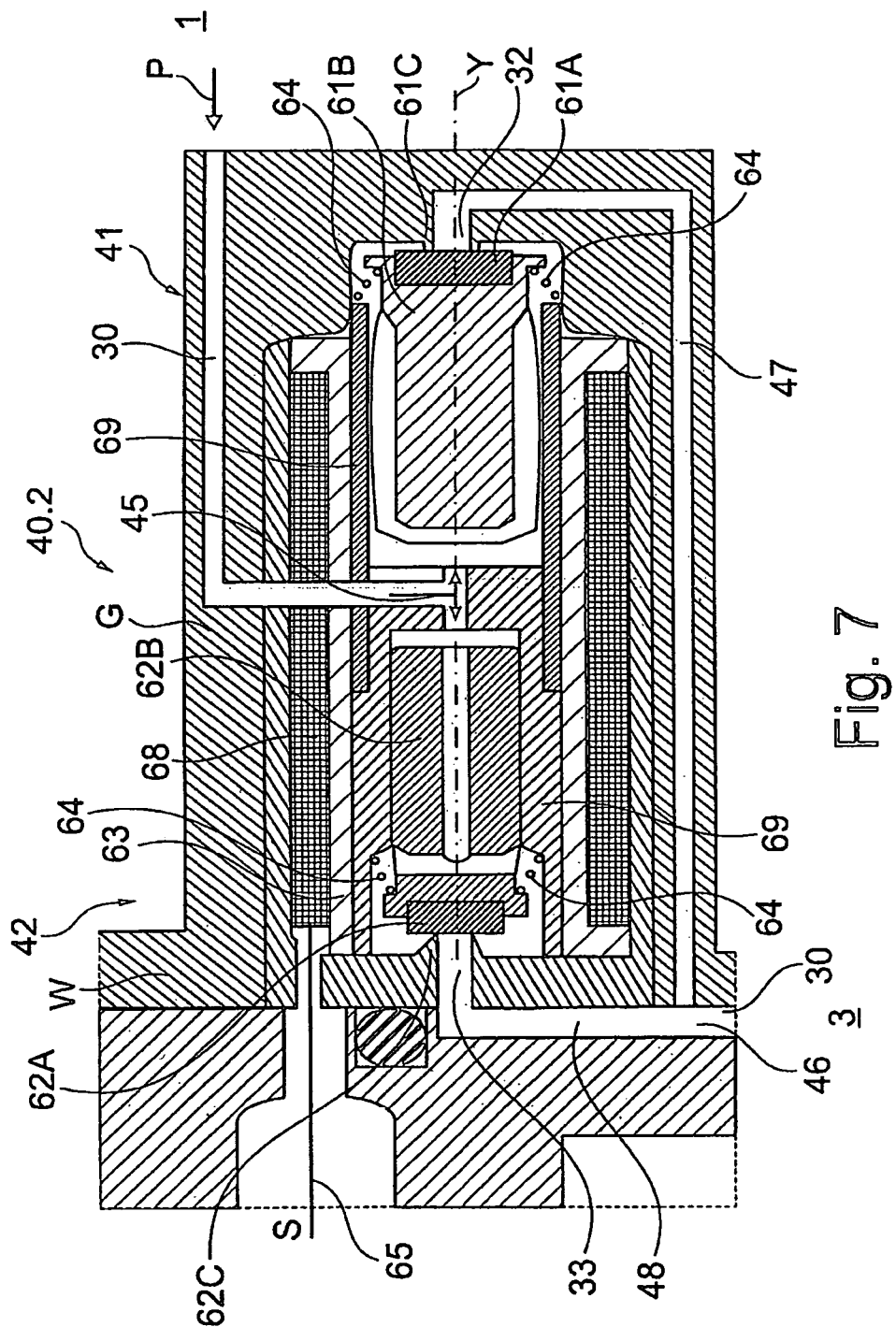
FIG. 7 shows an embodiment of a compressed air supply system for use in a pneumatic system according to FIG. 1A with a solenoid valve arrangement in the form of a double-armature solenoid valve, in which the primary valve and the secondary valve are connected in parallel.

For further understanding of FIG. 2A, reference is made to FIG. 5 or to FIG. 8, in which a solenoid valve arrangement 40.1 or 40.2 with primary valve 41 and secondary valve 42 is formed commonly in one construction as a double-armature solenoid valve. The same designations are expediently used for identical or similar parts or parts of identical or similar function. FIGS. 5 to 7 show a solenoid valve arrangement 40.1 in which according to FIG. 1B a primary valve 41 and a secondary valve 42—normally closed—are arranged in a series configuration. FIG. 8 shows a solenoid valve arrangement 40.2 in which, according to FIG. 1A, a primary valve 41 and a secondary valve 42—normally closed—are arranged in a parallel configuration. In this case—with reference to FIGS. 5 to 8—the double-armature solenoid valve has a primary armature 61B carrying a first sealing element 61A of the primary valve 41 and a secondary armature 62B carrying a second sealing element 62A of the secondary valve 42, which armatures are arranged in a coil former 63—which is common to both—of a coil. The primary valve 41 and the secondary valve 42 can be operated at the same time or sequentially by a common control current via the coil former 63—which is common to both—by setting different spring forces of the valve springs 64.

FIG. 2A(B) shows a possible characteristic of a control current in the form of a switching current $I_S$ in relation to the pressure characteristic of FIG. 2A(A), as can be used, for example, for actuating the solenoid valve arrangement 40.1 of FIGS. 5 to 7 or the solenoid valve arrangement 40.2 of FIG. 8. As the switching current $I_S$ increases, the primary armature 61B pulls in the primary valve 41 on account of the induction forces acting upon it as a result of the threshold value of the first switching current $I_{S1}$ at time point $t_1$ and so lifts the first sealing element 61A from the first valve seat 61C. As a result of this, the primary valve 41 opens—that is, transfers into the open control state (1) shown in FIG. 2A(C).

As the switching current $I_S$ increases further, the secondary valve 42 also operates upon achieving the threshold value of the second switching current $I_{S2}$ at time point $t_2$. That is, the secondary armature 62B is pulled in on account of the induction force acting upon it as a result of the second switching current $I_{S2}$ so that the second sealing element 62A is lifted from the second valve seat 62C. As a result of this, the secondary valve 42 also opens—that is, transfers into the open control state (1) shown in FIG. 2A(D). This results—in the case of both open primary valve 41 and open secondary valve 42—in a drop of the pressure in the gallery 95 of the pneumatic device 90 and in the compressed air supply system 10A, 10B from the first pressure level $p_1$ to a residual pressure $p_0$, as is shown as a continuous line in FIG. 2A(A).

In contrast to known solutions, fast venting of the compressed air supply system 10A, 10B when the accumulator filling process has terminated is therefore achieved without a vent popping noise occurring and without an additional high-pressure vent valve having to be provided. Instead, the present "two-step" operation of a solenoid valve arrangement 40A, 40B with a primary valve 41 and a secondary valve 42 in a directly controlled vent solenoid valve arrangement allows fast high-pressure venting, wherein in the case of the currently described embodiment it is additionally ensured that already dried air is not lost.

Venting the compressed air supply system 10A, 10B in the case of vehicle lowering during the control operation can, however, also be carried out by immediate opening both of the primary valve 41 and of the secondary valve 42. The immediate opening in practice leads to a very quick pressure drop from the aforesaid bellows pressure $p_B$ in the compressed air supply system 10A, 10B and consequently leads to the best possible regeneration of the air drier 22. Provision is regularly made in a pneumatic system 100, 100A, 100B, 100C, 100D for a residual pressure maintaining function, e.g., by means of a residual pressure maintaining valve 67 (e.g. of FIG. 1D), which leads to a residual pressure in the system 100, 100A, 100B, 100C, 100D lying above atmospheric pressure, so that a complete venting of the bellows 91 therefore does not happen. Instead, a residual pressure, which lies above atmospheric pressure $p_0$, is maintained in the bellows 91, and this avoids collapsing of the bellows 91 or disadvantageous sticking together of the bellows walls and so forth.

Within the scope of the previously referred to venting process, the smallest nominal diameter of the first restrictor 31 in comparison to the nominal diameter sum of the second restrictor 32 and third restrictor 33 again generally determines the regeneration capability of the air drier 22. The compressed air is expanded in the compressed air supply line in the venting direction via the first restrictor 31 and regenerates the drier granulate when air flows through the air drier 22 against the venting direction. The quantitative regeneration capability is ultimately determined by the nominal diameter ratio of the first restrictor 31 and the sum of the two nominal diameters of the primary valve 41 and of the secondary valve 42 or the sum of the nominal diameters of the second restrictor 32 and of the third restrictor 33, which significantly influence the aforesaid pressure swing amplitude. An improved regeneration capability of the air drier 22 is therefore ensured, taking into consideration an advantageous venting sequence during the control operation and also when accumulator filling has terminated. In particular, the compressed air supply system 10A, 10C with the described functions can be advantageously used in order to also achieve faster lowering speeds of a vehicle's body or a reduction of the ground clearance especially for use in SUVs. This has the following background: during the lowering of a vehicle in the event of level controlling for reducing the ground clearance, with immediate opening of the overall solenoid valve arrangement 40A, 40B with summed nominal diameter of the restrictors 32, 33, venting of the compressed air supply system 10A, 10B can be carried out comparatively quickly, frequently within the region of several tenths of a second, before one of the solenoid valves 93 is opened. The design of a solenoid valve arrangement 40A, 40B as a directly controlled vent solenoid valve arrangement according to FIG. 1A, FIG. 1B, i.e., without a control valve, enables this comparatively fast complete switching of the solenoid valve arrangement 40A, 40B. This enables the directly controlled vent solenoid valve arrangement, especially in combination with the nominal diameter sum of the restrictors 32 and 33, which is comparatively large in relation to the small nominal diameter of the first restrictor 31. The combination of a directly controlled vent solenoid valve arrangement with the concept of the restrictors 31, 32, 33 enables an advantageous lowering of the vehicle, wherein excessive noise is avoided and disturbing influences or opposing influences in relation to a regeneration of the air drier 22 are avoided.

The descending ramp of the control current $I_S$, which is evident from FIG. 2A(B), leads to the primary valve 41 and the secondary valve 42 again transferring into the closed control state (0) at time points $t_3$, $t_4$, which are shown in FIG. 2A(C) and FIG. 2A(D).

Whereas FIGS. 2A(A) to (D) illustrate a compressed air supply system 10A with a solenoid valve arrangement 40A in which the primary valve 41 and the secondary valve 42 are arranged as a parallel connection, the basic effect can nevertheless also be achieved with a compressed air supply system 10B in which the solenoid valve arrangement 40B is constructed with a primary valve 41 and secondary valve 42 in a series connection, even if a quantitative result in the case of a series connection will be different from that of the parallel connection. In principle, however, with reference to FIG. 2A, in the case of a series connection of primary valve 41 and secondary valve 42, initially with the exclusive opening of the primary valve 41, a pressure drop from $p_{Sp}$ to a pressure level $p_1$ is also created for the case of an accumulator filling termination function. The pressure drop from $p_{Sp}$ to $p_1$ is not carried out, however, in the case of a series connection (in contrast to a parallel connection) with a completely open vent line 30. Rather, by opening the primary valve 41, an additional volume for the compressed air and an outlet via the second restrictor 32 into the separate line section 47' are made available. This leads to a different pressure drop than in the case of a parallel connection. Nevertheless, this pressure drop to a pressure level $p_1$ below a pressure $p_{Sp}$ can be used to avoid a vent popping noise during venting after accumulator filling termination.

The remaining functional states, especially in the case of immediate opening both of the primary valve 41 and of the secondary valve 42, also apply to the case of a compressed air supply system 10B with primary valve 41 and secondary valve 42 of a solenoid valve arrangement 40B arranged in a series connection. Overall, in all cases of a solenoid valve arrangement 40A—40D of a compressed air supply system 10A-10D, the possibility of comparatively fast venting of the compressed air supply system 10A-10D, with initially ensuing low-noise reduction of pressure peaks and yet adequate drier regeneration, is advantageously achieved. Particularly at the function point of accumulator filling termination, the avoidance of a vent popping noise and overall improved acoustics of the compressed air supply system 10A-10D are also ensured.

These advantages are created especially in the currently described embodiment of a compressed air supply system 10A-10D with a direct connection of a compressed air volume solely via the primary valve 41 and secondary valve 42. Such a directly controlled solenoid valve arrangement 40A-40D functions in an especially advantageous manner without an additional control valve. Nevertheless, in one embodiment, a solenoid valve arrangement for indirect connection of a compressed air volume using a control valve, or a plurality of control valves, can also be used in order to realize the basic inventive concept, which is not limited to the currently described embodiment.

The foregoing embodiments—slightly modified—also apply in a similar way to a solenoid valve arrangement 40C, 40D of a compressed air supply system 10C, 10D in which the primary valve 41 and the secondary valve 42 are designed to open when de-energized. With reference to FIG. 2B(A), a practically equal pressure drop in the example of the accumulator filling termination can be realized for a holding current, shown in FIG. 2B(B), for the normally open solenoid valve arrangements 40C, 40D. However—unless a residual pressure maintaining function of the residual pressure maintaining valve 67 is in effect—a pressure drop to $p_0=p_{Atmosphere}$ is regularly to be expected on account of the normally open solenoid valve arrangement 40C, 40D. In this respect, the pressure is essentially $p_0$ for long periods t in FIG. 2B(A) and not slightly greater than $p_0$ as in FIG. 2A(A).

For holding the pressure $p_{Sp}$ in the way shown in FIG. 2B(A), during the operation of the air compressor 21 a holding current $I_H$ is selected to be of such value above a holding current $I_{H2}$ for a secondary armature of a secondary valve 42 that, as a result, a defined pressure limit is achieved in order to avoid the accumulator pressure $p_{Sp}$ acting upon an armature of the primary valve 41 or secondary valve 42. In other words, the holding current $I_H$ is to be of such a value that it is able, via the induction forces, to hold the armatures of the primary valve 41 and secondary valve 42 upon an associated valve seat—consequently, the solenoid valve arrangement 40C, 40D is closed when being energized by a holding current $I_H$.

For the following pressure characteristic curve of FIG. 2B(A) and also the pneumatic control states, shown in FIG. 2B(C) and FIG. 2B(D), of a secondary armature of the secondary valve 42 or of a primary armature of a primary valve 41 of the normally open solenoid valve arrangement 40C, 40D, magnets with low hystereses are preferably used, i.e., a primary armature of the primary valve 41 is pulled in with a relatively low current $I_{H1}$ and also drops out with this relatively low current $I_{H1}$, whereas the secondary armature of the secondary valve 42 is pulled in and drops out with a comparatively high holding current $I_{H2}$. A design of the corresponding current ramps can be carried out depending upon requirement.

If, therefore, the holding current $I_H$ drops to a holding current $I_{H2}$ for the secondary valve 42, the secondary armature of the secondary valve 42 drops out, which results in a pressure drop from $p_{Sp}$ to $p_1$. As the holding current $I_H$ drops further to $I_{H1}$, after a short time a comparatively quick pressure drop then takes place, after which the primary armature of the primary valve 41 also drops out. FIG. 2B(C) and FIG. 2B(D) additionally show the pneumatic control states (1), which follow each other after a short time, for an armature of the secondary valve 42 or primary valve 41, which is then again essentially normally open.

The advantages explained above also apply to a solenoid valve arrangement 40C with the corresponding modification for the series connection of primary valve 41 and secondary valve 42 of the solenoid valve arrangement 40D. Also, fast venting of the compressed air supply system 10C, 10D in the case of a vehicle lowering during the control operation can be carried out by immediate opening both of the primary valve 41 and of the secondary valve 42, in which a holding current $I_H$ is reduced comparatively quickly below the holding current $I_{H1}$.

Figure 3:
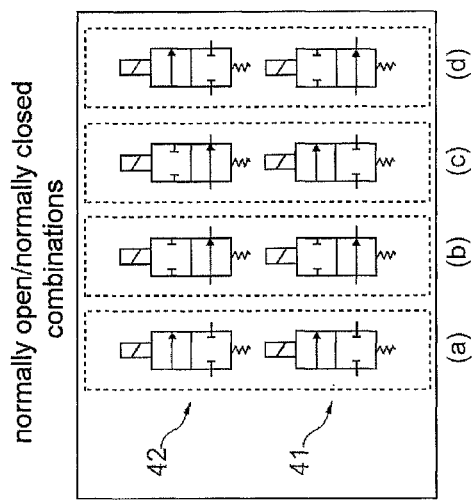
FIG. 3 is a symbolic representation of different normally open/normally closed combinations for the primary valve and the secondary valve of the pneumatic section of the solenoid valve arrangement within the scope of the compressed air supply system of the embodiments of FIGS. 1A-1D.

FIG. 3 shows a selection of normally open/normally closed combinations, which are possible for the primary valve 41 and the secondary valve 42 of the solenoid valve arrangement 40A, 40B, 40C, 40D in the embodiment of the compressed air supply system 10A, 10B, 10C, 10D of FIG. 1. The normally closed variant, which is referred to as (a), both for the primary valve 41 and for the secondary valve 42 is shown in the compressed air supply system 10A, 10B of FIG. 1. The variant shown as (b) is shown as a modification in the embodiment of the compressed air supply system 10C, 10D of FIG. 1. Correspondingly, the variants (c) and (d) can also be realized by modification of the embodiments of FIG. 1. A corresponding adjustment of the control currents $I_S$ and switching currents of FIG. 2 is possible. In this way, the variant (b), for example, in which both the primary valve 41 and the secondary valve 42 are normally open and which are shown in the compressed air supply system 10C, 10D of FIG. 1C, FIG. 1D, can be realized. The additional variants (c) and (d) provide that the primary valve 41 and the secondary valve 42 are operated differently when de-energized. Specifically, are operated so that one of the two is normally open and the other is normally closed. In the case of the variants (b), (c) and (d), it has proved, furthermore, to be advantageous to provide a residual pressure maintaining valve 67 at least in the first or second branch 48, 47 of the vent line, provided with a normally open valve, and/or— especially in the case of variant (b) of FIG. 3 or FIG. 1D—to provide a residual pressure maintaining valve 67 directly in the section of the vent line 30 between port 46 and vent port 3. The residual pressure maintaining valve 67 of FIG. 1D, which is designed as a check valve, has the advantage that for one thing entry of foreign bodies into the otherwise open vent line 30 is reliably prevented, providing this cannot already be ensured by means of the filter 3.1. This has also proved to be advantageous for realizing the aforesaid residual pressure maintaining function which makes it possible to maintain a certain residual pressure in the compressed air supply system 10A, 10B, 10C, 10D and/or in the pneumatic device 90. In a current pneumatic spring unit, a residual pressure of between 0.5 and 1.5 bar has proved to be advantageous in order to avoid an undesirable collapsing of the bellows.

Figure 4:
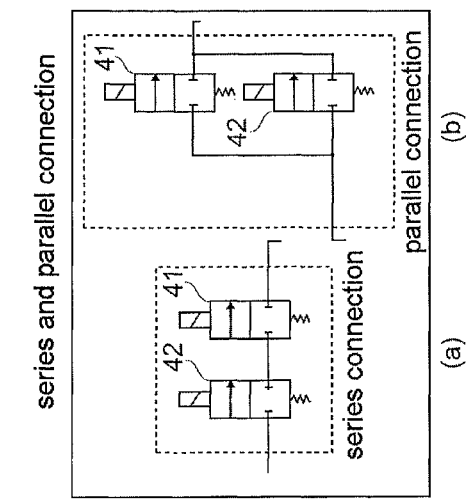
FIG. 4 is a symbolic representation of possibilities of a series connection or parallel connection for a primary valve and a secondary valve of the pneumatic section of the solenoid valve arrangement within the scope of the compressed air supply system of the embodiments of FIGS. 1A-1D.

FIG. 4—for normally closed combinations of the primary valve 41 and secondary valve 42 (variant (a) of FIG. 3 or FIG. 1A, FIG. 1B)—shows two ways of modifying the embodiment of a compressed air supply system. Thus, according to variant (b) of FIG. 4, a parallel connection of primary valve 41 and secondary valve 42 can be provided (as in FIG. 1A). According to variant (a) of FIG. 4, a series connection of primary valve 41 and secondary valve 42 can also be provided (as in FIG. 1B). Normally open combinations of the primary valve 41 and of the secondary valve 42 are shown in FIG. 1C and FIG. 1D. The variants of FIG. 4 (a), (b) and FIG. 3 (a) to (d) can also be optionally combined with each other in other respects without deviating from the concept of the invention.

FIG. 5 shows a constructionally realized preferred embodiment of a compressed air supply system 10. This is realized as a device with a housing arrangement 50 which has a number of housing sections. A drive in the form of a partially depicted motor M is arranged in the first section 51 and the air compressor 21, which can be driven by the motor M, is arranged in the second section 52. The air compressor 21 additionally has a piston 55 which is movable in a reciprocating manner in the compression chamber 54 and which is driven by the motor M via a shaft and connecting rod 56. Air, via an air feed interface E0 of the aforesaid air feed 0, is fed to the compression chamber 54. Compressed air which is at the outlet of the compression chamber 54 is transferred via an outlet valve 57 or the like to a pressure source interface E1 for the aforesaid compressed air feed 1.

The compressed air is discharged into a third section 53 of the compressed air supply system 10. The third section 53 contains the air drier 22 with desiccant container 58 and a solenoid valve arrangement 40 as a series arrangement of primary valve 41 and secondary valve 42. Corresponding first, second, and third housing sections A, B, C, which if necessary are sealed in relation to each other via a seal D, or via a plurality of seals D, are associated with the housing sections. A third housing section C and a cover T, which closes off the third housing section C on the bottom side, are especially associated with the third section 53. The cover T forms a compressed air supply system interface E2 for the aforesaid compressed air feed 2. The first restrictor 31, with a defined nominal diameter, is formed in the present case as an opening in the cover T for the desiccant container 58. The cover T also forms a vent interface E3 for the aforesaid vent port 3. The cover T also forms an electrical control interface S for connecting the aforesaid control line 65 to the solenoid valve arrangement 40.1. The cover T in its dimensions is largely congruent with a bottom contour of the desiccant container 58 and can be seated upon the desiccant container 58 in a practically accurately fitting manner.

The third housing section C is formed by a wall W of the desiccant container 58, which is filled with dry granulate, and the cover T. The dry granulate is held under pressure by means of a spring F in the desiccant container 58. The wall W of the desiccant container 58 in turn forms a recess G on the bottom side which is arranged symmetrically to a largely center axis Y of the desiccant container 58. The vent valve arrangement in the form of the solenoid valve arrangement 40.1 is accommodated symmetrically in the recess G, i.e., in the present case parallel and centrally to the axis Y of the desiccant container 58. The cover T seals off the recess G together with the solenoid valve arrangement 40.1, which is located therein, in the said manner.

As a result of the therefore U-shaped arrangement of the first, second and third sections 51, 52, 53 and the associated first, second and third housing sections A, B, C, an installation-space saving compressed air supply system 10 is made available and, moreover, enables horizontal interfaces, specifically referred to as S, E0, E1, E2, E3. In principle, this distribution can also be realized by arranging the first to third sections in an arrangement which differs from the U-shaped arrangement, e.g. in a Z-shaped arrangement.

In addition, a saving in weight can be achieved by the outer contour of the desiccant container 58 of the air drier 22 and the cover T being used as parts of the housing arrangement 50.

Figure 5A:
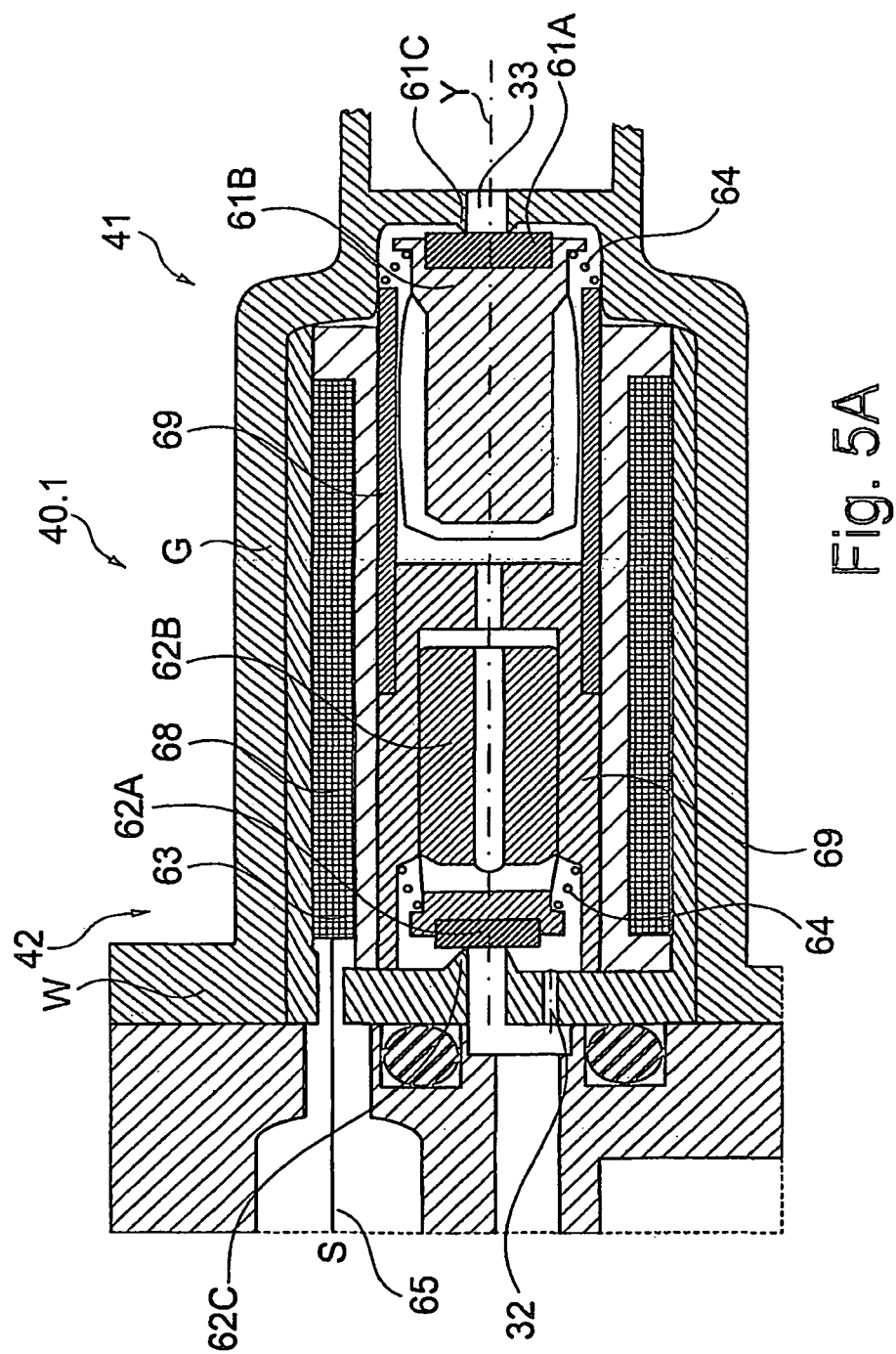
FIG. 5A and FIG. 5B show two embodiments according to detail X of the compressed air supply system of FIG. 5 in the region of the double-armature solenoid valve.
Figure 5B:
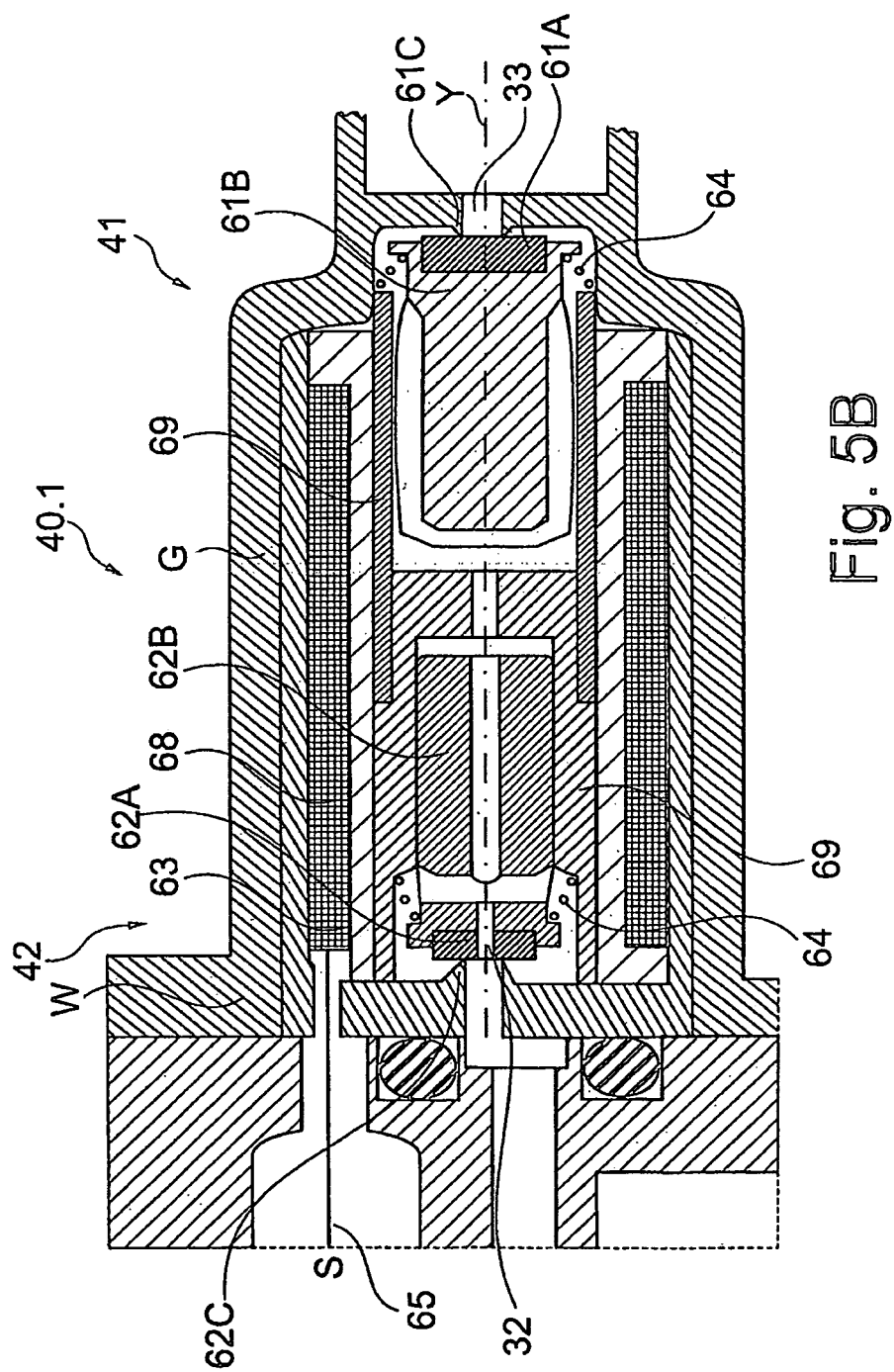

Furthermore, detail X of FIG. 5 in FIG. 5B, and modified in FIG. 5A, is shown in enlargement as a solenoid valve arrangement 40.1, in which in the present case the primary valve 41 and the secondary valve 42 are formed as a series arrangement in a double-armature solenoid valve. The double-armature solenoid valve of FIG. 5A, FIG. 5B, which in its function is also evident from FIG. 6, has a primary armature 61B carrying a first sealing element 61A of the primary valve 41 and a secondary armature 62B carrying a second sealing element 62A of the secondary valve 42, wherein the armatures are arranged as the core of a coil inside the winding 68 of the coil which is embedded in the coil former 63. The primary armature 61B and secondary armature 62B are arranged on an axis Y of the double-armature solenoid valve in the armature guide tube 69 through which flows compressed air. The first sealing element 61A or second sealing element 62A is associated in each case with a first or second valve seat 61C, 62C, wherein the first valve seat 61C and the second valve seat 62C lie opposite the input side and output side of the coil former 63 which is contained within a core yoke.

In comparison to FIG. 5B, in FIG. 5A the second restrictor 32 can be seen as an additional so-called high-pressure vent passage next to the second valve seat 62C. In the solenoid valve arrangement 40.1 of FIG. 5B, which for the sake of simplicity is similarly referred to, the restrictor 32 is formed in the secondary armature 62B as the so-termed nominal diameter of the central restriction passage which extends along on the axis Y. This restriction passage also passes through the second sealing element 62A. The latter part in the sealing element 62A is dispensed with in FIG. 5A on account of the high-pressure vent passage which forms the second restrictor 32.

Represented in FIG. 5A and FIG. 5B are the openings in the solenoid valve arrangement 40.1, which are suitable for forming the nominal diameters of the second restrictor 32 and third restrictor 33. In the present case, the nominal diameter of the second restrictor 32 is formed by a nominal diameter of a restriction passage on the axis Y in the secondary armature 62B of the secondary valve 42, i.e. as shown in FIG. 5B. The nominal diameter of the third restrictor 33 is formed as the nominal diameter of a first valve seat 61C in the primary valve 41. The view of FIG. 5, which illustrates the compressed air guiding, shows in detail the air drier 22 and the solenoid valve arrangement 40.1, which in the present case is enclosed on three sides in the recess G of the desiccant container 58. From this, it is evident that the recess G is free of desiccant. A vent flow P from the gallery 95, which is represented by continuous arrows, can be carried out according to requirement via the compressed air supply interface E2 and the vent interface E3 in the cover T. According to the symbolically represented vent flow P, flow passes through the air drier 22 opposite to a supply flow $\bar{p}$ for regeneration. The supply flow $\bar{p}$, which is represented by dashed arrows, for supplying the pneumatic device 90 is carried out via the gallery 95 via the pressure source interface E1 and the compressed air supply interface E2.

In the normally closed position on both sides—shown in view (a) of FIG. 6—of the double-armature solenoid valve which is shown in FIG. 5 and FIG. 5B, the first sealing element 61A and second sealing element 62A are seated on the first valve seat 61C and second valve seat 62C, respectively. In this position, the solenoid valve arrangement 40.1 is completely closed, i.e., primary valve 41 and secondary valve 42 are closed in a pneumatically sealed state.

In the position shown in view (b) of FIG. 6, the primary valve 41 is open in any event, i.e., the primary armature 61B is pulled towards the axial center of the coil when the coil former 63 is energized and so lifts the first sealing element 61A from the first valve seat 61C. A vent flow P can be guided in the way shown by arrows via a passage and restriction passage which are guided along the axis Y of the double-armature solenoid valve, i.e., through the restrictor 32 for the vent interface E3. The position of view (b) of FIG. 6 is suitable for the first stage of venting as was described, with reference to FIG. 2A-FIG. 2D, during venting when accumulator filling has terminated.

View (c) of FIG. 6 shows a further position of the solenoid valve arrangement 40.1 with opened primary valve 41 and opened secondary valve 42—the primary armature 61B and secondary armature 62B being pulled towards the axial center of the coil so that the first sealing element 61A and second sealing element 62A are lifted from the first valve seat 61C and second valve seat 62C. The vent flow P can be guided via the comparatively wide nominal diameter of the restrictor 33, as identified by the arrows, for example in the case of lowering of the vehicle during the control operation or in the case of a second venting stage, as described with reference to FIG. 1A-FIG. 1D.

An elastomer seat or even a metal stop, depending upon demand and leakage requirement, is basically suitable for realization of the valve seat 61C, 62C. In the present case, the first sealing element 61A and/or second sealing element 62A is, or are, also formed from an elastomer for an elastomer seat.

FIG. 7—in an alternative constructional realization to that of FIG. 5—shows a solenoid valve arrangement 40.2 in which the primary valve 41 and the secondary valve 42 are interconnected in a parallel connection, in the present case following the principle of FIG. 1A. For the sake of simplicity, the same designations have been used for identical or similar parts or parts of identical or similar function, as already used in FIG. 5, FIG. 5A, FIG. 5B and FIG. 6, so that with regard to the basic construction and the parts used for the solenoid valve arrangement 40.2, which is also realized as a double-armature solenoid valve, reference can basically be made to the description of FIG. 5 to FIG. 6. The double-armature solenoid valve of the solenoid valve arrangement 40.2 is shown in the present case in a normally closed state which applies both to the primary valve 41 and to the secondary valve 42. In other words, the solenoid valve arrangement 40.2 shown in FIG. 7 is in a normally closed state on both sides, as is shown in FIG. 1A. This state is similar to the closed state on both sides as is shown in FIG. 6A for the solenoid valve arrangement 40.1 corresponding to FIG. 1B.

An essential difference between the solenoid valve arrangements 40.2 and 40.1 is the passage routing for compressed air, described in the following text, in the solenoid valve arrangement 40.2—that is, in the region of the vent line 30 of FIG. 1A in contrast to the vent line 30 of FIG. 1B. In particular, in FIG. 7, similar to FIG. 1A, an inlet-side, i.e., compressed air connection-side, pneumatic port 45, and an outlet-side, i.e., vent-side, pneumatic port 46, can be seen. Similarly, a compressed air connection-side line section of the vent line 30, already explained with reference to FIG. 1A, and a vent-side line section of the vent line 30, already explained in FIG. 1A, can be seen. Between the ports 45, 46, the primary valve 41 is pneumatically connected in a first branch line 47 and the secondary valve 42 is pneumatically connected in a second branch line 48. Furthermore, in FIG. 7 the nominal diameter of a second restrictor 32 between port 45 and primary valve 41 can be seen as an outlet-side, possibly also an inlet-side, opening cross section of an inlet to a guide space for the primary armature 61B. Also, the nominal diameter of a third restrictor 33 can be seen as the opening diameter of the second valve seat 62C of the secondary valve 42, possibly also the nominal diameter of a central restriction passage on the axis Y in the secondary armature. A vent flow P is represented in FIG. 7 by means of arrows in the vent line 30. As already explained with reference to FIG. 1A, the vent flow P can thus be selectively guided via the primary valve 41 with associated nominal diameter of the second restrictor 32 and/or via the secondary valve 42 with associated nominal diameter of the third restrictor 33 from a compressed air feed to a vent port. The advantages, as are basically shown based on the principle of operation explained with reference to FIG. 2, also apply to the solenoid valve arrangement 40.2 shown in FIG. 7.

In summary, a compressed air supply system 10, 10A, 10B, 10C, 10D for operating a pneumatic device 90 of a pneumatic spring unit of a vehicle has been described, and has:

i. an air feed 0 and an air compressor 21 for supplying a compressed air feed 1 with compressed air, ii. a pneumatic connection, especially a vent line 30, with a vent valve arrangement in the form of a controllable solenoid valve arrangement 40.1, 40.2, 40A, 40B, 40C, 40D and a vent port 3 for discharging air, and iii. a pneumatic connection, especially a compressed air supply line 20 with an air drier 22 and a compressed air port 2 for supplying the pneumatic device 90 with compressed air.

According to the invention, it is provided in this case that the solenoid valve arrangement 40.1, 40.2, 40A, 40B, 40C, 40D has a primary valve 41 and a secondary valve 42, wherein the primary valve 41 and the secondary valve 42 can be activated by a common controller 49 of the solenoid valve arrangement 40.1, 40.2, 40A, 40B, 40C, 40D which acts upon both valves.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A compressed air supply system for operating a pneumatic device, the system comprising:
   an air feed;
   an air compressor configured to supply a compressed air feed with compressed air;
   a vent line having arranged therein:
     a solenoid vent valve arrangement having a primary solenoid valve and a secondary solenoid valve, wherein the primary solenoid valve and the secondary solenoid valve are independently actuatable by a common controller of the solenoid valve arrangement, and
     a vent port configured to discharge air, and
   a compressed air supply line having arranged therein:
     an air drier, and
     a compressed air port configured to supply the pneumatic device with compressed air,
   wherein the solenoid vent valve arrangement includes only a single inlet side port and a single outlet side port, and
   wherein each of the primary solenoid valve and the secondary solenoid valve allow for flow from the inlet side port to the outlet side port.

2. The compressed air supply system as claimed in claim 1, wherein the solenoid vent valve arrangement includes a pneumatic vent-side port and a pneumatic compressed air connection-side port arranged in the vent line.

3. The compressed air supply system as claimed in claim 1, wherein the primary valve and the secondary valve are arranged in a parallel connection, the primary valve being arranged in a first branch line of the parallel connection and the secondary valve being arranged in a second branch line of the parallel connection, the first branch line and the second branch line both being connected to the single inlet side port and the single outlet side port of the of the solenoid vent valve arrangement.

4. The compressed air supply system as claimed in claim 1, wherein the primary valve and the secondary valve are arranged in a series connection, the primary valve and the secondary valve being arranged in a common single line section between a vent-side port and compressed air connection-side port of the vent line.

5. The compressed air supply system as claimed in claim 1, wherein at least one of the primary valve and the secondary valve includes a pressure limiter.

6. The compressed air supply system as claimed in claim 1, wherein the vent line has a residual pressure maintaining valve.

7. The compressed air supply system as claimed in claim 1, wherein the solenoid vent valve arrangement includes no other valves and is configured to directly connect to a compressed air volume via the primary valve and the secondary valve.

8. The compressed air supply system as claimed in claim 1, further comprising a first restrictor arranged between the compressed air port and the air drier, and at least one of a second restrictor in the vent line located upstream of the primary valve, and a third restrictor located upstream of the secondary valve.

9. The compressed air supply system as claimed in claim 8, wherein a sum of nominal diameters of the second restrictor and the third restrictor is larger than a nominal diameter of the first restrictor.

10. The compressed air supply system as claimed in claim 9, wherein the sum of the nominal diameters of the second restrictor and the third restrictor is greater than twice the size of the nominal diameter of the first restrictor.

11. The compressed air supply system as claimed in claim 1, wherein the common controller comprises a magnetic section of the solenoid vent valve arrangement.

12. The compressed air supply system as claimed in claim 11, wherein the solenoid vent valve arrangement is a double-armature solenoid valve having a primary armature carrying a first sealing element of the primary valve and a secondary armature carrying a second sealing element of the secondary valve, and wherein the primary and secondary armatures are arranged in or enclosed by a common coil former.

13. The compressed air supply system as claimed in claim 11, wherein the magnetic section includes at 1 east one of a common coil former and one of a common control line and a common control unit.

14. The compressed air supply system as claimed in claim 1, wherein the air drier includes a desiccant container having a wall defining a desiccant-free recess, and wherein the solenoid vent valve arrangement is arranged at least partially in the recess.

15. The compressed air supply system as claimed in claim 1, wherein the primary solenoid valve includes a primary armature carrying a first sealing element, wherein the secondary solenoid valve includes a secondary armature carrying a second sealing element, and wherein the primary solenoid valve and the secondary solenoid valve are independently actuatable by the common controller as a result of the primary armature and the secondary armature being independently actuatable by the common controller.

16. A pneumatic system comprising a pneumatic device and a compressed air supply system configured to operate the pneumatic device, the compressed air supply system comprising:
an air feed;
an air compressor configured to supply a compressed air feed with compressed air;
a vent line having arranged therein:
a solenoid vent valve arrangement having a primary solenoid valve and a secondary solenoid valve, wherein the primary solenoid valve and the secondary solenoid valve are independently actuatable by a common controller of the solenoid valve arrangement, and
a vent port configured to discharge air, and
a compressed air supply line having arranged therein:
an air drier, and
a compressed air port configured to supply the pneumatic device with compressed air,
wherein the solenoid vent valve arrangement includes only a single inlet side port and a single outlet side port, and
wherein each of the primary solenoid valve and the secondary solenoid valve allow for flow from the inlet side port to the outlet side port.

17. The pneumatic system as claimed in claim 16, wherein the pneumatic device is a pneumatic spring unit of a vehicle.

18. The compressed air supply system as claimed in claim 16, wherein the primary solenoid valve includes a primary armature carrying a first sealing element, wherein the secondary solenoid valve includes a secondary armature carrying a second sealing element, and wherein the primary solenoid valve and the secondary solenoid valve are independently actuatable by the common controller as a result of the primary armature and the secondary armature being independently actuatable by the common controller.

19. A method for operating a pneumatic device, the method comprising:
performing, using a compressed air supply system comprising:
an air feed and an air compressor configured to supply a compressed air feed with compressed air;
a vent line having arranged therein a solenoid vent valve arrangement having a primary solenoid valve and a secondary solenoid valve, wherein the primary solenoid valve and the secondary solenoid valve are independently actuatable by a common controller of the solenoid valve arrangement;
a vent port configured to discharge air; and
a compressed air supply line with an air drier and a compressed air port configured to supply the pneumatic device with compressed air,
the steps of:
supplying the compressed air feed with compressed air using the air feed and the air compressor,
discharging air via the vent line using the solenoid vent valve arrangement and via the vent port, and
supplying the pneumatic device with compressed air via the compressed air supply line,
wherein the solenoid vent valve arrangement includes only a single inlet side port and a single outlet side port, and
wherein each of the primary solenoid valve and the secondary solenoid valve allow for flow from the inlet side port to the outlet side port.

20. The method as claimed in claim 19, further comprising actuating, in a first operating mode, the primary valve and the secondary valve of the solenoid vent valve arrangement in a time-based sequential manner by a control current that (i) initially crosses a first threshold value and, after an operation-dependent period of time, (ii) crosses a second threshold value, the control current being one of a switching current and a holding current.

21. The method as claimed in claim 19, further comprising actuating, in a second operating mode, the primary valve and the secondary valve of the solenoid vent valve arrangement at substantially the same time by a control current that crosses a threshold value, the control current being formed as one of a switching current and a holding current.

22. The method as claimed in claim 19, farther comprising operating a first vent restrictor using the common controller when a first threshold value is crossed.

23. The method as claimed in claim 22, further comprising operating a second vent restrictor when a second threshold value is crossed.

24. The method as claimed in claim 19, wherein the pneumatic device is a pneumatic spring unit of a vehicle.

25. The method as claimed in claim 19, wherein the primary solenoid valve includes a primary armature carrying a first sealing element, wherein the secondary solenoid valve includes a secondary armature carrying a second sealing element, and wherein the primary solenoid valve and the secondary solenoid valve are independently actuatable by the common controller as a result of the primary armature and the secondary armature being independently actuatable by the common controller.

26. A compressed air supply system for operating a pneumatic device, the system comprising:
   an air feed;
   an air compressor configured to supply a compressed air feed with compressed air;
   a vent line having arranged therein:
      a solenoid vent valve arrangement having a 2/2 primary solenoid valve having a primary armature, a 2/2 secondary solenoid valve having a secondary armature, wherein primary armature of the primary solenoid valve and the secondary armature of the secondary solenoid valve are independently actuatable by a common coil former of the solenoid valve arrangement, and
      a vent port configured to discharge air, and
   a compressed air supply line having arranged therein:
      an air drier, and
      a compressed air port configured to supply the pneumatic device with compressed air,
   wherein the solenoid vent valve arrangement includes only a single inlet side port and a single outlet side port,
   wherein each of the primary solenoid valve and the secondary solenoid valve allow for flow from the inlet side port to the outlet side port, and
   wherein the primary and secondary valves are (i) arranged in a parallel connection, and (ii) disposed in and actuatable by the common coil former.

27. A compressed air supply system for operating a pneumatic device, the system comprising:
   an air feed;
   an air compressor configured to supply a compressed air feed with compressed air;
   a vent line having arranged therein:
      a solenoid vent valve arrangement having a 2/2 primary solenoid valve having a primary armature, a 2/2 secondary solenoid valve having a secondary armature, wherein the primary armature of the primary solenoid valve and the secondary armature of the secondary solenoid valve are independently actuatable by a common coil former of the solenoid valve arrangement, and
      a vent port configured to discharge air, and
   a compressed air supply line having arranged therein:
      an air drier, and
      a compressed air port configured to supply the pneumatic device with compressed air,
   wherein the solenoid vent valve arrangement includes only a single inlet side port and a single outlet side port,
   wherein each of the primary solenoid valve and the secondary solenoid valve allow for flow from the inlet side port to the outlet side port, and
   wherein the primary and secondary valves are (i) arranged in a series connection and (ii) disposed in and actuatable by the common coil former.

* * * * *